(12) United States Patent
Odate et al.

(10) Patent No.: US 9,637,096 B2
(45) Date of Patent: May 2, 2017

(54) VEHICLE CONTROL APPARATUS

(71) Applicant: HONDA MOTOR CO., LTD., Minato-Ku, Tokyo (JP)

(72) Inventors: Shotaro Odate, Utsunomiya (JP); Tsutomu Terasaki, Utsunomiya (JP); Kazuo Yamashita, Utsunomiya (JP); Kazuhiro Daidou, Utsunomiya (JP); Yoshinori Noguchi, Utsunomiya (JP); Shinji Sato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/736,753

(22) Filed: Jun. 11, 2015

(65) Prior Publication Data

US 2015/0360655 A1    Dec. 17, 2015

(30) Foreign Application Priority Data

Jun. 16, 2014  (JP) ................................ 2014-123334
Jun. 18, 2014  (JP) ................................ 2014-124959
(Continued)

(51) Int. Cl.
*B60T 7/22* (2006.01)
*B60T 13/66* (2006.01)
(Continued)

(52) U.S. Cl.
CPC .............. *B60T 7/22* (2013.01); *B60T 13/662* (2013.01); *B60W 10/18* (2013.01); *B60W 30/02* (2013.01);
(Continued)

(58) Field of Classification Search
CPC ........ B60T 7/22; B60T 13/662; B60W 10/18; B60W 30/02
(Continued)

(56) References Cited

U.S. PATENT DOCUMENTS 8,706,372 B2    4/2014  Cetinkaya et al.
2009/0173816 A1*  7/2009  Odate ................ B60R 22/44
                                                    242/374

(Continued)

FOREIGN PATENT DOCUMENTS

JP       H06234342 A    8/1994
JP       H11334576 A   12/1999
(Continued)

OTHER PUBLICATIONS

Office Action dated Dec. 6, 2016 issued over the corresponding Japanese Patent Application No. 2014-124968 with the English translation of pertinent portion.
(Continued)

*Primary Examiner* — Yazan Soofi
(74) *Attorney, Agent, or Firm* — Carrier Blackman & Associates, P.C.; Joseph P. Carrier; Jeffrey T. Gedeon

(57) ABSTRACT

A vehicle control apparatus is equipped with a vehicle velocity detecting unit that detects a vehicle velocity of a driver's own vehicle, and an automatic brake control unit configured to carry out an automatic brake control process for causing a braking force to be generated automatically in the wheels without reliance on a braking operation when the vehicle is involved in a collision. The automatic brake control unit makes the braking force to the wheels smaller as the vehicle velocity becomes higher after the vehicle collision.

14 Claims, 13 Drawing Sheets

(30) Foreign Application Priority Data

Jun. 18, 2014 (JP) ................................ 2014-124968
Jun. 18, 2014 (JP) ................................ 2014-124974

(51) Int. Cl.
*B60W 10/18* (2012.01)
*B60W 30/02* (2012.01)

(52) U.S. Cl.
CPC .... *B60T 2201/024* (2013.01); *B60W 2520/00* (2013.01)

(58) Field of Classification Search
USPC ...................................................... 701/70, 45
See application file for complete search history.

(56) References Cited

U.S. PATENT DOCUMENTS

| | | | | |
|---|---|---|---|---|
| 2009/0204296 | A1* | 8/2009 | Lich | B60T 7/12 701/45 |
| 2011/0266106 | A1* | 11/2011 | Suzuki | B60T 7/042 188/360 |
| 2012/0083983 | A1* | 4/2012 | Danz | B60T 7/12 701/70 |

FOREIGN PATENT DOCUMENTS

| | | |
|---|---|---|
| JP | 2005247046 A | 9/2005 |
| JP | 2005254945 A | 9/2005 |
| JP | 2009-532790 A | 9/2009 |
| JP | 2011126436 A | 6/2011 |
| JP | 2012-001091 A | 1/2012 |
| JP | 2012505117 A | 3/2012 |

OTHER PUBLICATIONS

Office Action dated Jan. 10, 2017 issued over the corresponding Japanese Patent Application No. 2014-124974 with the English translation of pertinent portion.

Office Action dated Nov. 15, 2016 issued over the corresponding Japanese Patent Application No. 2014-123334 with the English translation of pertinent portion.

\* cited by examiner

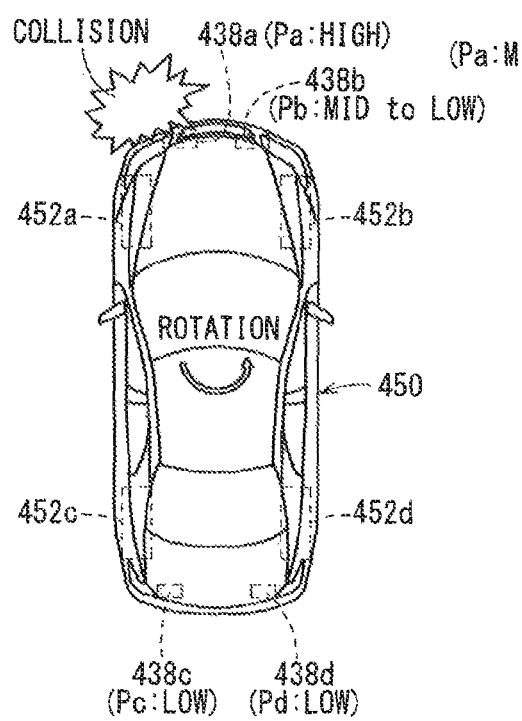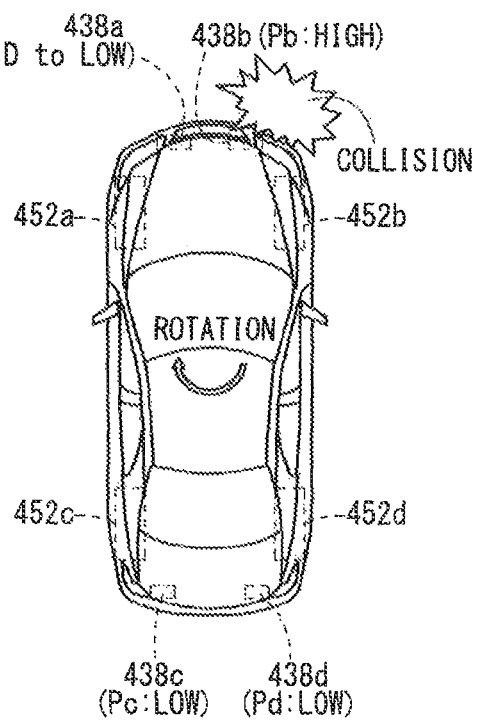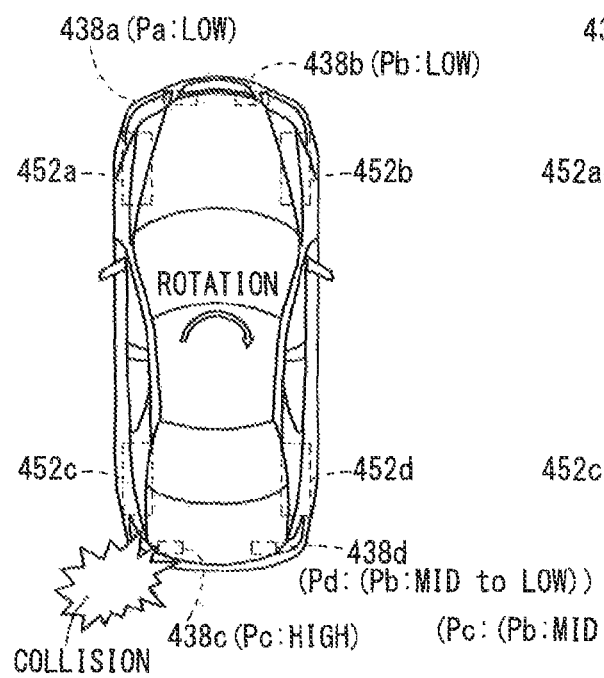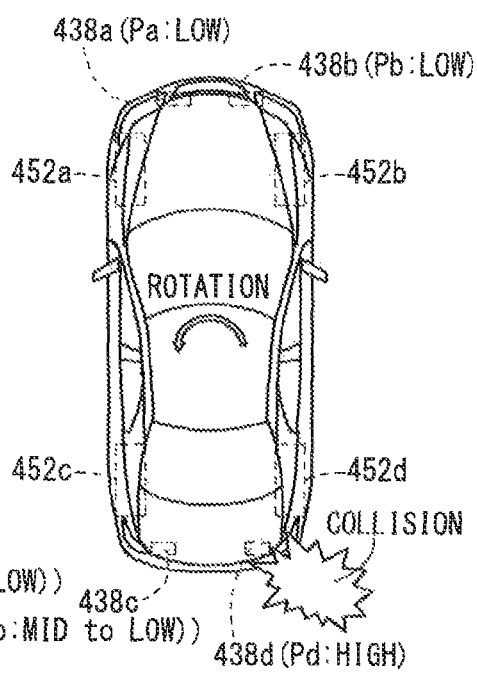

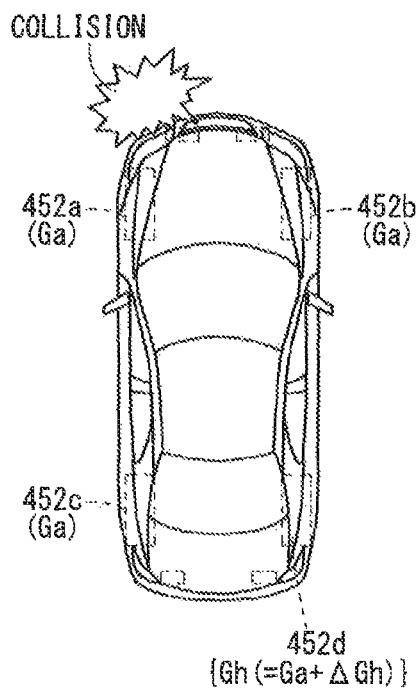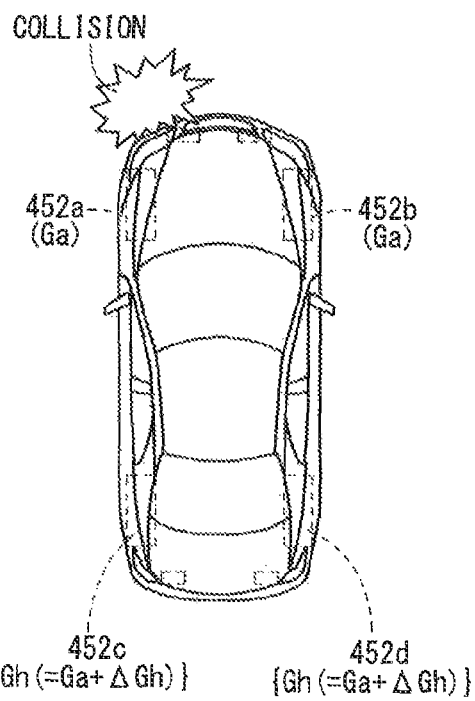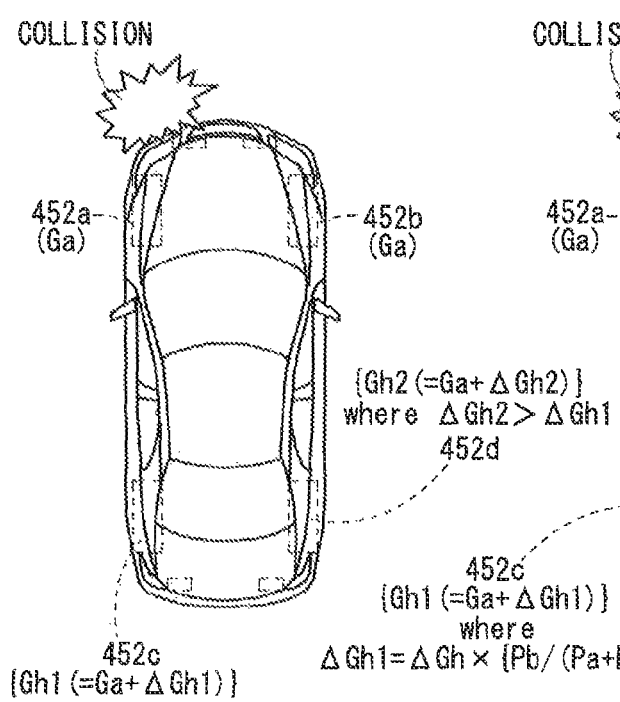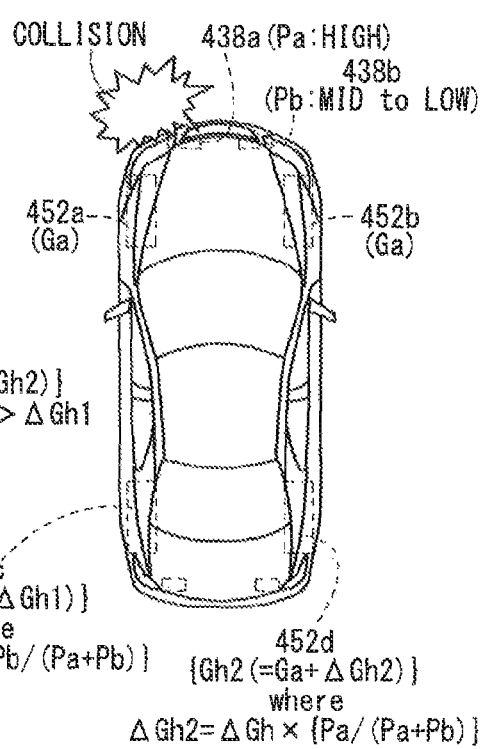

VEHICLE CONTROL APPARATUS

CROSS-REFERENCE TO RELATED APPLICATIONS

This application is based upon and claims the benefit of priority from Japanese Patent Applications No. 2014-123334 filed on Jun. 16, 2014, No. 2014-124959 filed on Jun. 18, 2014, No. 2014-124968 filed on Jun. 18, 2014 and No. 2014-124974 filed on Jun. 18, 2014, the contents all of which are incorporated herein by reference.

BACKGROUND OF THE INVENTION

Field of the Invention

The present invention relates to a vehicle control apparatus equipped with an automatic brake control unit for carrying out an automatic brake control process that causes a braking force to be generated automatically in the wheels without reliance on a braking operation when the vehicle is involved in a collision.

Description of the Related Art

As a first conventional technology, in Japanese Laid-Open Patent Publication No. 2012-001091, a technical concept is disclosed in which, when an airbag is deployed upon the occurrence of a vehicle collision, a predetermined braking force, which is set beforehand, is generated automatically in the wheels to thereby stop the vehicle.

Further, as a second conventional technology, in Japanese Laid-Open Patent Publication No. 2009-532790 (PCT), a technical concept is disclosed in which, by stopping an automatic brake control process based on operation of an accelerator pedal after a predetermined dead time has elapsed since the occurrence of a vehicle collision, stopping of the automatic brake control process due to an erroneous operation of the accelerator pedal at the time of a vehicle collision can be avoided.

Furthermore, as a third conventional technology, in the aforementioned Japanese Laid-Open Patent Publication No. 2012-001091, a brake control device is disclosed in which the control time of automatic braking is made variable based on the vehicle velocity after a collision. The brake control device is equipped with a collision detecting sensor for detecting a collision of the driver's own vehicle, and a vehicle velocity sensor for detecting the velocity of the driver's own vehicle. In the case that a collision of the driver's own vehicle is detected by the collision detecting sensor, a brake driving force control unit actuates the brake control device, to thereby control an automatic braking time at the time that the braking force is generated automatically, based on the vehicle velocity that is detected by the vehicle velocity sensor after a collision has been detected.

SUMMARY OF THE INVENTION

However, with the first conventional technology, a constant braking force is generated in the wheels without relation to the vehicle velocity after a vehicle collision. Therefore, there is a fear that locking of the wheels (slipping of the wheels with respect to the road surface) or disturbances in the behavior of the wheels may occur when the vehicle is traveling at a comparatively high speed after a vehicle collision.

Incidentally, in the case that a vehicle collision takes place on a downhill slope, the vehicle is accelerated by gravity, whereas in the case that a vehicle collision takes place on an uphill slope, the vehicle is decelerated by gravity. However, according to the first conventional technology, a constant braking force is generated in the wheels regardless of the whether the vehicle is positioned on a downhill slope or an uphill slope at the time of a vehicle collision.

For this reason, for example, if the braking force is set comparatively small, in the case that a vehicle collision takes place on a downhill slope, the vehicle cannot be decelerated efficiently. On the other hand, if the braking force is set comparatively large, in the case that a vehicle collision takes place on an uphill slope, the occupant is subjected to a higher than necessary load from the seatbelt.

According to the second conventional technology, in the case that the rising time until the braking force to the wheels reaches a target braking force from start of the automatic brake control process is longer than a dead time, the automatic brake control process is terminated by operation of the accelerator pedal before the braking force to the wheels reaches the target braking force. In particular, under a low-temperature environment such as in cold climates or the like, in comparison with a warm-temperature environment, since the rising time of the braking force becomes longer due to an increase in the viscosity of the brake fluid, it is likely for the automatic brake control process to be stopped before the braking force to the wheels reaches the target braking force.

According to the third conventional technique, if an offset collision takes place, due to the fact that a moment is generated by the offset collision about the center of gravity of the vehicle, there is a concern that the vehicle will undergo rotational movement (spin) even though a constant braking force is generated.

A first object of the present invention is to provide a vehicle control apparatus, which can reliably decelerate the vehicle, while also suppressing disturbances in the vehicle behavior and locking of the wheels after a vehicle collision.

Further, a second object of the present invention is to provide a vehicle control apparatus, which can efficiently decelerate the vehicle after a vehicle collision in the case that the vehicle collision takes place on a downhill slope, together with suppressing the load than an occupant receives from the seatbelt in the case that the vehicle collision takes place on an uphill slope.

Furthermore, a third object of the present invention is to provide a vehicle control apparatus, which can reliably cause the braking force to the wheels to increase to a target braking force, while avoiding the automatic brake control process from being stopped by a mistaken operation of the accelerator pedal or the brake pedal when the vehicle is involved in a collision.

Further still, a fourth object of the present invention is to provide a vehicle control apparatus in which, at the time of an offset collision, a force tending to rotate the vehicle can be suppressed, and in which a contribution to rotation of the vehicle can be prevented.

For achieving the aforementioned first object, a vehicle control apparatus according to the present invention includes a vehicle velocity detecting unit configured to detect a vehicle velocity of a driver's own vehicle, and an automatic brake control unit that performs an automatic brake control process by causing a braking force applied to wheels to be generated automatically without reliance on a braking operation when the vehicle is involved in a vehicle collision. The automatic brake control unit makes a braking force to the wheels smaller as the vehicle velocity detected by the vehicle velocity detecting unit becomes higher after the vehicle collision.

In accordance with such a configuration, since the braking force to the wheels is made smaller as the vehicle velocity becomes higher after a vehicle collision, the vehicle can be reliably decelerated while also suppressing disturbances in the vehicle behavior and locking of the wheels after the vehicle collision.

The above vehicle control apparatus may further include an antilock brake control unit that performs an antilock brake control process for suppressing locking of the wheels, and a vehicle behavior stabilizing control unit that performs a vehicle behavior stabilizing control process for suppressing disturbances in vehicle behavior. When the antilock brake control process or the vehicle behavior stabilizing control process is actuated during operation of the automatic brake control process, the automatic brake control process is stopped, and the braking force applied to the wheels may be generated based on the antilock brake control process or the vehicle behavior stabilizing control process.

Due to this configuration, even if the automatic brake control process is being carried out after a vehicle collision, the antilock brake control process and the vehicle behavior stabilizing control process can be operated with priority. Consequently, locking of the wheels and disturbances in the vehicle behavior can further be suppressed after a vehicle collision.

The above-noted vehicle control apparatus may further include an antilock brake control unit that performs an antilock brake control process for suppressing locking of the wheels, and a vehicle behavior stabilizing control unit that performs a vehicle behavior stabilizing control process for suppressing disturbances in vehicle behavior. When the vehicle velocity after a vehicle collision, which is detected by the vehicle velocity detecting unit, is greater than or equal to a predetermined velocity, the antilock brake control process and the vehicle behavior stabilizing control process may be made capable of being actuated, whereas when the vehicle velocity after a vehicle collision, which is detected by the vehicle velocity detecting unit, is less than the predetermined velocity, the antilock brake control process and the vehicle behavior stabilizing control process may be prohibited from being actuated.

In accordance with such a configuration, in the event that the vehicle velocity after a collision is greater than or equal to a predetermined vehicle velocity, since the antilock brake control process and the vehicle behavior stabilizing control process can be actuated, locking of the wheels and disturbances in the vehicle behavior can be effectively suppressed. Further, in the event that the vehicle velocity after a collision is less than the predetermined vehicle velocity, operations of the antilock brake control process and the vehicle behavior stabilizing control process are prohibited, and the automatic brake control process is performed, whereby it is possible to effectively suppress a secondary collision of the vehicle.

In accordance with the present invention, since the braking force to the wheels is made smaller as the vehicle velocity becomes higher after a vehicle collision, the vehicle can be reliably decelerated while also suppressing disturbances in the vehicle behavior and locking of the wheels after the vehicle collision.

For achieving the aforementioned second object, the vehicle control apparatus may further include an inclination detecting unit configured to detect an inclination of a road surface on which the driver's own vehicle is positioned at a time of a vehicle collision, and the automatic brake control unit may cause the braking force to the wheels when the driver's own vehicle is positioned on a downhill slope at the time of the collision to be greater than a braking force to the wheels when the driver's own vehicle is positioned on an uphill slope at the time of the collision.

In accordance with such a configuration, if a vehicle collision takes place on a downhill slope, since a comparatively large braking force is generated in the wheels, the driver's own vehicle can be efficiently decelerated after the vehicle collision. Further, if the vehicle collision takes place on an uphill slope, since a comparatively small braking force is generated in the wheels, the load that is imparted to the occupant from the seat belt can be suppressed.

In the above vehicle control apparatus, the automatic brake control unit may cause a braking force to the wheels when the driver's own vehicle is hit from behind on the downhill slope to be smaller than a braking force to the wheels when the driver's own vehicle is hit from the front on the downhill slope.

Due to this configuration, even if the driver's own vehicle is accelerated after a vehicle collision by being hit from behind on a downhill slope and receiving energy from the collision, since the braking force to the wheels at this time is comparatively small, the load imparted to the occupant from the seat belt can be suppressed.

In the above vehicle control apparatus, the automatic brake control unit may continue to generate the braking force applied to the wheels until a predetermined braking continuation time has elapsed from stopping of the vehicle after the vehicle collision. In addition, a braking continuation time when the driver's own vehicle is hit from behind on the downhill slope is made longer than a braking continuation time when the driver's own vehicle is hit from behind on the uphill slope.

In accordance with such a configuration, following a rear collision that occurs on a downhill slope, once the vehicle has stopped, it is possible to effectively prevent the driver's own vehicle from moving due to a creep phenomenon.

According to the present invention, it is possible to efficiently decelerate the vehicle after a vehicle collision in the case that the vehicle collision takes place on a downhill slope, together with suppressing the load that an occupant receives from the seatbelt in the case that the vehicle collision takes place on an uphill slope.

For achieving the aforementioned third object, in the vehicle control apparatus, there may further be included a braking force detecting unit configured to detect the braking force generated in the wheels by the automatic brake control process. In this case, the automatic brake control unit may stop the automatic brake control process based on operation of an accelerator pedal or a brake pedal, whereas when the vehicle is involved in a collision, even when the accelerator pedal or the brake pedal is operated, the automatic brake control process may continue until a braking force detected by the braking force detecting unit reaches a target braking force.

According to such a configuration, since even in the event that the accelerator pedal or the brake pedal is operated at the time of a vehicle collision, the automatic brake control process is continued until the braking force to the wheels reaches a target braking force, the braking force to the wheels can reliably be made to increase to the target braking force, while avoiding the automatic brake control process from being stopped by a mistaken operation of the accelerator pedal or the brake pedal when the vehicle is involved in a collision.

In the above vehicle control apparatus, when the vehicle is stopped without the braking force detected by the braking force detecting unit having reached the target braking force, the automatic brake control unit may terminate the automatic brake control process after an elapse of a predetermined braking continuation time from stopping of the vehicle.

Owing to such a configuration, for example, even if an abnormality occurs in the brake system due to the influence of the vehicle collision, such that only a braking force that is smaller than the target braking force can be generated, the automatic brake control process can be terminated in a safe state.

According to the present invention, since even in the event that the accelerator pedal or the brake pedal is operated at the time of a vehicle collision, the automatic brake control process is continued until the braking force to the wheels reaches a target braking force, the braking force to the wheels can reliably be made to increase to the target braking force, while avoiding the automatic brake control process from being stopped by a mistaken operation of the accelerator pedal or the brake pedal when the vehicle is involved in a collision.

For achieving the aforementioned fourth object, the vehicle control apparatus may further include a collision site detecting unit configured to detect a collision site of the driver's own vehicle, and a control unit. Additionally, when the collision is an offset collision, the control unit may increase the braking force applied to at least one wheel on a side opposite from the collision site detected by the collision site detecting unit to be greater than the braking force applied to other wheels.

In the case that the vehicle is subjected to an offset collision, a moment is generated about the center of gravity of the vehicle, which leads to a concern that the vehicle will undergo rotational movement (spin). Thus, by increasing the braking force applied to at least one of the wheels on a side opposite to the collision site to be greater than that of the other wheels, at the time of an offset collision, a force that tends to rotate the vehicle can be suppressed, and a contribution to rotation of the vehicle can be prevented.

Further, such offset collisions include collisions (front collisions) in which a portion of the front part of the vehicle collides against other vehicles or obstacles, and collisions (rear collisions) in which a portion of a rear part of the vehicle collides against other vehicles or obstacles. The at least one wheel on a side opposite from the collision site, in the case that the offset collision is a front collision, refers to at least one wheel from among the rear wheels, whereas in the case that the offset collision is a rear collision, refers to at least one wheel from among the front wheels.

In the above-described vehicle control apparatus, when the collision is the offset collision, the control unit may increase the braking force applied to a wheel at a diagonally opposite position to the wheel nearest to the collision site to be greater than the braking force applied to the other wheels.

In accordance with such a configuration, at the time of an offset collision, since the braking force applied to a wheel at a diagonally opposite position to the wheel nearest to the collision site is increased greater than the braking force applied to the other wheels, a force that tends to rotate the vehicle at the time of the offset collision can be suppressed efficiently, and a contribution to rotation of the vehicle can be prevented.

In the above vehicle control apparatus, when the collision is the offset collision, the control unit may increase the braking force applied to a plurality of wheels on the opposite side from the collision site to be greater than the braking force applied to a plurality of wheels on same side as the collision site.

According to this configuration, at the time of an offset collision, a force tending to rotate the vehicle can be suppressed, and a contribution to rotation of the vehicle can be prevented.

In this case, the control unit may cause the braking force applied to the wheel at a diagonally opposite position to the wheel nearest to the collision site to be greatest.

According to this configuration, at the time of an offset collision, a force tending to rotate the vehicle can be suppressed, and a contribution to rotation of the vehicle can be prevented.

Further, when the collision is the offset collision, the control unit may cause the braking force applied to the plurality of wheels on the opposite side from the collision site to increase individually, respectively, corresponding to the collision site.

Due to such a configuration, in accordance with the collision site moving away from the center in the widthwise direction of the vehicle, the moment that is generated around the center of gravity of the vehicle becomes larger. Thus, by increasing the braking force applied to the plurality of wheels on the opposite side from the collision site to be individually greater, respectively, corresponding to the collision site, at the time of an offset collision, a force that tends to rotate the vehicle can be suppressed efficiently, and a contribution to rotation of the vehicle can be prevented.

In the above-described vehicle control apparatus, there may further be included a vehicle behavior stabilizing control unit that stabilizes the behavior of the driver's own vehicle based on at least a yaw rate and a steering angle of a steering wheel of the driver's own vehicle. In this case, when the collision is the offset collision, the control unit may disable control by the vehicle behavior stabilizing control unit.

The steering wheel is moved in unintended directions by an offset collision, and further, by the yaw rate sensor outputting an abnormal value, the vehicle behavior stabilizer generates unintended braking forces with respect to the wheels, so that when an offset collision occurs, there is a concern that the force tending to rotate the vehicle cannot be suppressed sufficiently. Thus, in the event that the collision is an offset collision, by disabling the control that is carried out by the vehicle behavior stabilizer, suppression of forces that tend to rotate the vehicle at the time of an actual offset collision can be exhibited sufficiently.

Disabling of the control that is carried out by the vehicle behavior stabilizer can be implemented by making the vehicle behavior stabilizer inoperable, or by not using (e.g., blocking) signals that are output from the vehicle behavior stabilizer, etc.

According to the present invention, at the time of an offset collision, a force tending to rotate the vehicle can be suppressed, and a contribution to rotation of the vehicle can be prevented. Thus, the occurrence of secondary damage to the vehicle as a result of repeated collision thereof can be suppressed.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11A is a schematic diagram showing an offset collision (front collision) to a left front portion of the vehicle;

FIG. 11B is a schematic diagram showing an offset collision (front collision) to a right front portion of the vehicle;

FIG. 11C is a schematic diagram showing an offset collision (rear collision) to a left rear portion of the vehicle;

FIG. 11D is a schematic diagram showing an offset collision (rear collision) to a right rear portion of the vehicle;

FIG. 12A is a schematic diagram showing a first resetting of a deceleration by a deceleration resetting unit;

FIG. 12B is a schematic diagram showing a second resetting of the deceleration by the deceleration resetting unit;

FIG. 12C is a schematic diagram showing a third resetting of the deceleration by the deceleration resetting unit;

FIG. 12D is a schematic diagram showing a fourth resetting of the deceleration by the deceleration resetting unit.

DESCRIPTION OF THE PREFERRED EMBODIMENTS

Preferred embodiments of a vehicle control apparatus according to the present invention, in relation to a vehicle in which the vehicle control apparatus is incorporated, will be described in detail below with reference to the accompanying drawings.

First Embodiment

Figure 1:
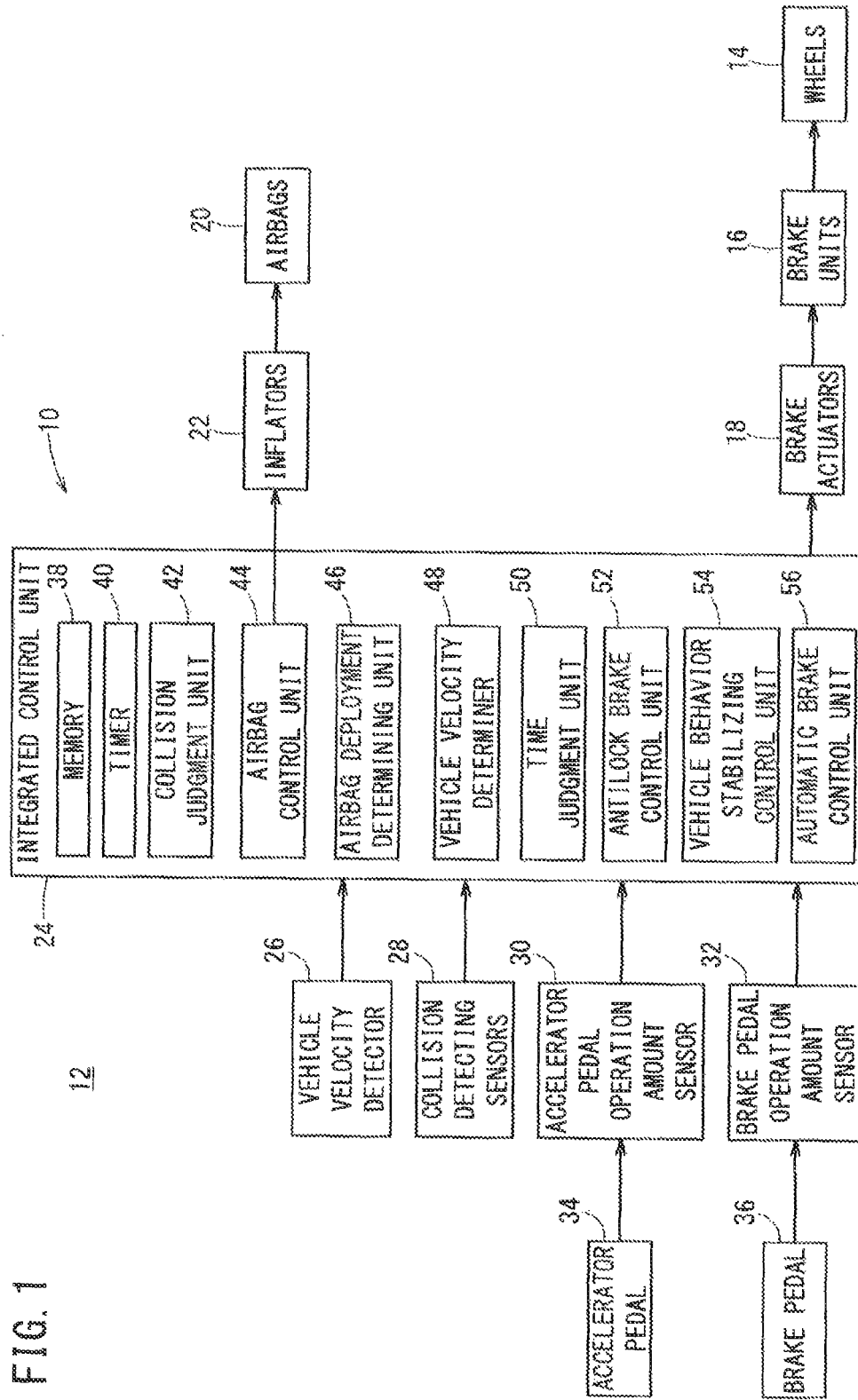
FIG. 1 is a block diagram of a vehicle equipped with a vehicle control apparatus according to a first embodiment of the present invention.

A vehicle control apparatus 10 according to a first embodiment will be described with reference to FIGS. 1 through 3.

A vehicle (driver's own vehicle) 12 is constituted as a four-wheeled vehicle having a pair of left and right front wheels and a pair of left and right rear wheels. As shown in FIG. 1, the vehicle 12 is equipped with a vehicle control apparatus 10 that carries out various control processes including an automatic brake control process for respective wheels 14.

The vehicle control apparatus 10 includes four brake units 16 constituted from disk brakes or the like for generating braking forces in the respective wheels 14, brake actuators 18 disposed corresponding to the brake units 16 for controlling the brake pressures (brake hydraulic pressures) therein, inflators 22 that serve to deploy airbags 20, and an integrated control unit 24.

The brake actuators 18 generate brake pressures of sizes responsive to an amount by which a brake pedal 36 is operated. Further, the brake actuators 18 generate brake pressures the sizes of which are responsive to brake control signals output from the integrated control unit 24 without reliance on an operation (braking operation) of the brake pedal 36.

The airbags 20 are for the purpose of protecting an occupant or a pedestrian, etc., at the time of a vehicle collision, and may include a driver's seat front airbag, a passenger seat front airbag, side airbags, side curtain airbags, and an airbag for pedestrians. The inflator 22 serves to generate a gas for the purpose of deploying the airbags 20, and may be provided respectively corresponding to each of the airbags 20.

Various sensors, including a vehicle velocity detector (vehicle velocity detecting unit) 26, collision detecting sensors 28, an accelerator pedal operation amount sensor 30, and a brake pedal operation amount sensor 32, etc., are connected to the integrated control unit 24.

The vehicle velocity detector 26 can make use of wheel speed sensors provided in each of the wheels 14. In this case, an average value of the wheel speeds detected by the wheel speed sensors is detected as the vehicle velocity. The collision detecting sensors 28 serve to detect a vehicle collision, and include a pair of left and right front collision detecting sensors disposed on a front frame, a pair of left and right side collision sensors disposed on a center frame, and a pair of left and right rear collision sensors disposed on a rear frame. However, the number of and positions where the collision detection sensors 28 are arranged can be set arbitrarily. The collision detecting sensors 28 can also utilize an acceleration sensor (G sensor), for example. The accelerator pedal operation amount sensor 30 detects an amount by which an accelerator pedal 34 is operated, and the brake pedal operation amount sensor 32 detects an amount by which the brake pedal 36 is operated.

The integrated control unit 24 is constituted to contain an ECU (Electronic Control Unit). As is widely known, the ECU is a calculator or computational unit containing a microcomputer, and includes a CPU (Central Processing Unit), a memory 38 such as a ROM (Read Only Memory) and a RAM (Random Access Memory), etc., input devices such as an A/D converter and a D/A converter, etc., and a timer 40 that serves as a timing unit, etc. The ECU functions as various function realizing sections (function realizing unit), for example, a control unit, an arithmetic unit, and a processing unit or the like, by the CPU reading out and executing programs that are stored in the ROM.

In the memory 38 are stored a predetermined vehicle velocity V0, a braking continuation time t0, and an automatic brake setting map (automatic brake setting table). For the predetermined vehicle velocity V0, for example, a vehicle velocity is used at which a disturbance in the behavior of the vehicle, or locking of the wheels 14 (slipping of the wheels 14 with respect to the road surface) may take place after a vehicle collision. The braking continuation time t0 is a time for which generation of the braking forces applied to the respective wheels 14 continues from stopping of the vehicle after a vehicle collision. The predetermined vehicle velocity V0 and the braking continuation time t0 can be set arbitrarily.

Figure 2:
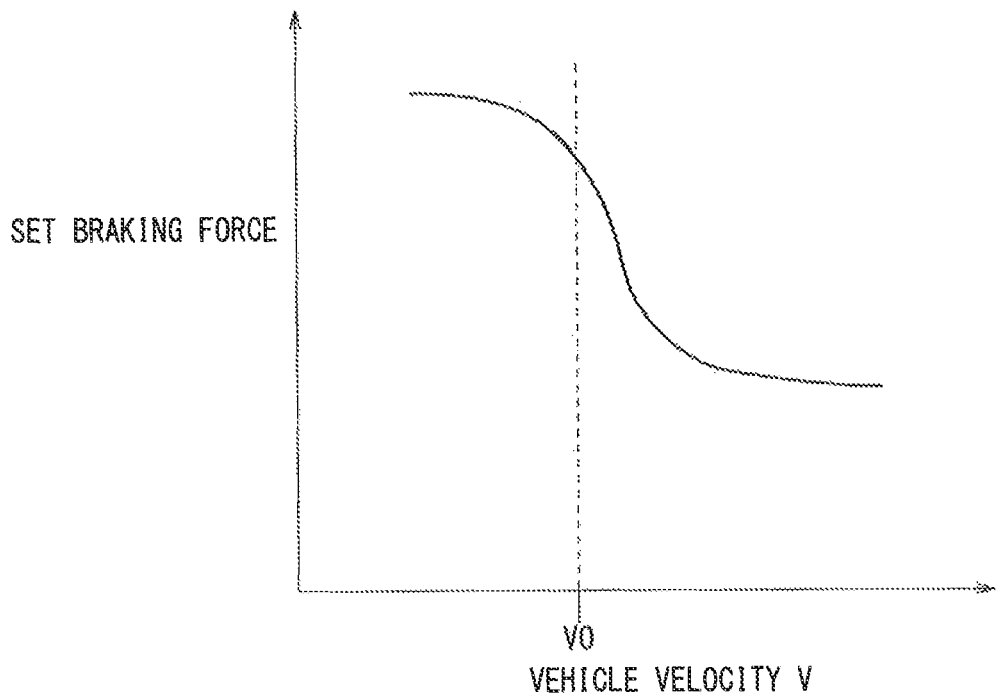
FIG. 2 is a map in which a relationship is shown between a set braking force and the vehicle velocity after a vehicle collision.

The automatic brake setting map, for example as shown in FIG. 2, is a map in which a relationship is indicated between a set braking force by the automatic brake control process and the vehicle velocity V after a vehicle collision, such that the braking force is set to become smaller as the vehicle velocity V increases. The timer 40 measures an elapsed time from stopping of the vehicle following a vehicle collision.

Further, in the integrated control unit 24, a non-illustrated acceleration sensor, such as an orthogonal 3-axis G sensor, a roll rate sensor, a yaw rate sensor, or the like, is provided. By such sensors, the posture, behavior, and the like of the driver's own vehicle 12, can be sensed.

The integrated control unit 24 includes a collision judgment unit 42, an airbag control unit 44, an airbag deployment determining unit 46, a vehicle velocity determiner 48, a time judgment unit 50, an antilock brake control unit 52, a vehicle behavior stabilizing control unit 54, and an automatic brake control unit 56.

The collision judgment unit 42 determines whether or not a vehicle collision has occurred based on output signals from the collision detecting sensors 28. More specifically, the collision judgment unit 42 determines whether or not a vehicle collision has occurred together with the collision state (front collision, side collision, rear collision), by comparing the output signals from the collision detecting sensors 28 and an output signal from the orthogonal 3-axis G sensor.

The airbag control unit 44 controls deployment and non-deployment of the airbags 20. Stated otherwise, the inflators 22 are controlled in order to deploy the airbags 20 based on output signals from the collision detecting sensors 28 and the collision state that is determined by the collision judgment unit 42. More specifically, the airbag control unit 44 does not deploy the airbags 20 in the case that the output signals from the collision detecting sensors 28 are less than or equal to a given threshold value (if the collision energy is comparatively small), and deploys the airbags 20 responsive to the collision state in the case that the output signals from the collision detecting sensors 28 exceed the threshold value.

The airbag deployment determining unit 46 determines whether or not the airbags 20 have been deployed (deployment condition of the airbag 20) based on an output signal from the airbag control unit 44 to the inflator 22.

The vehicle velocity determiner 48 judges whether or not the vehicle velocity V after a vehicle collision is greater than or equal to the predetermined vehicle velocity V0. The time judgment unit 50 judges whether or not a measurement time t of the timer 40 has surpassed a braking continuation time t0.

The antilock brake control unit 52 is a so-called ABS (Antilock Brake System), which when a braking force is generated in the wheels 14, carries out an antilock brake control process for suppressing sliding of the vehicle on the road surface while the wheels 14 are in a locked state. The antilock brake control unit 52 outputs a brake control signal (ABS control signal) to the brake actuators 18, so as to suppress locking of the wheels 14 based on an output signal from the wheel speed sensors.

The vehicle behavior stabilizing control unit 54 is constituted as a so-called VSA (Vehicle Stability Assist) system, such that when there are disturbances in the posture and behavior of the driver's own vehicle 12, a vehicle behavior stabilizing control process is carried out for avoiding sideways slipping, and improving the directional stability of the driver's own vehicle 12. Disturbances in the posture and behavior of the driver's own vehicle 12 are sensed by the aforementioned yaw rate sensor, etc.

More specifically, in the case that the behavior of the driver's own vehicle 12 is indicative of over-steering, the vehicle behavior stabilizing control unit 54 outputs a brake control signal (VSA control signal) to the brake actuators 18, so as to generate braking forces in the wheels 14 on the outer turning side of the front wheels. Further, in the case that the behavior of the driver's own vehicle 12 is indicative of under-steering, the vehicle behavior stabilizing control unit 54 outputs a brake control signal (VSA control signal) to the brake actuators 18, so as to generate braking forces in the wheels 14 on the inner turning side of the rear wheels.

The automatic brake control unit 56 outputs brake control signals (automatic brake control signals) to the brake actuators 18 at the time of a vehicle collision, whereby an automatic brake control process is carried out for automatically generating predetermined braking forces in the wheels 14 without reliance on an operation of the brake pedal 36 by the driver.

The vehicle 12, which is equipped with the vehicle control apparatus 10 according to the present embodiment, is constructed basically as described above. Next, a description will be given concerning the brake control process performed by the vehicle control apparatus 10.

Figure 3:
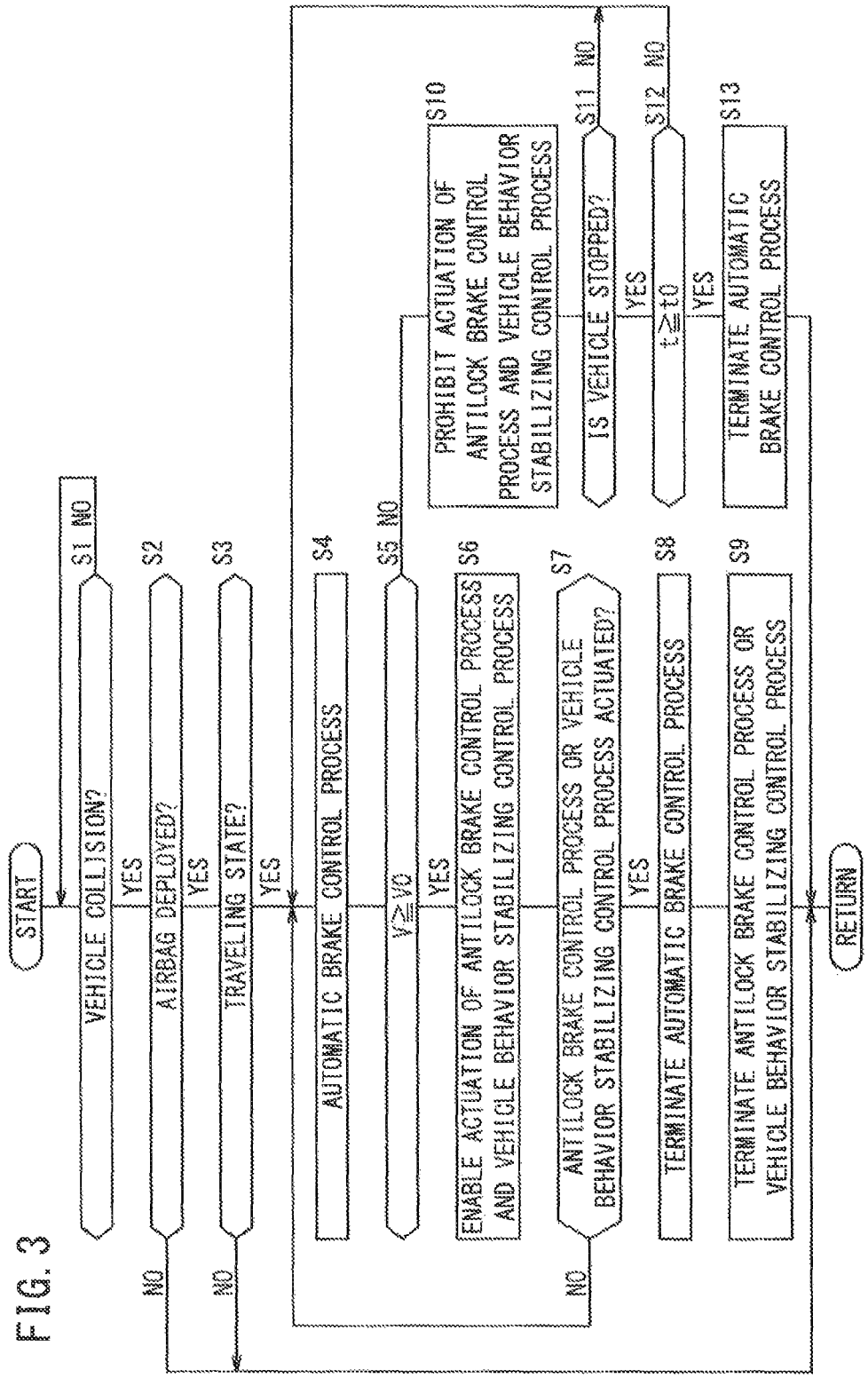
FIG. 3 is a flowchart for describing a brake control process performed by the vehicle control apparatus shown in FIG. 1.

As shown in FIG. 3, at first, the collision judgment unit 42 determines whether or not a vehicle collision has occurred based on output signals from the collision detecting sensors 28 (step S1). If it is judged by the collision judgment unit 42 that a vehicle collision has not occurred (step S1: NO), then the process of step S1 is repeated.

If it is judged by the collision judgment unit 42 that a vehicle collision has occurred (step S1: YES), then the airbag control unit 44 does not deploy the airbags 20 in the case that the output signals from the collision detecting sensors 28 are less than or equal to a given threshold value, and deploys the airbags 20 responsive to the collision state in the case that the output signals from the collision detecting sensors 28 exceed the threshold value.

In addition, the airbag deployment determining unit 46 determines whether or not the airbags 20 have been deployed (step S2). If the airbag deployment determining unit 46 determines that the airbags 20 are not deployed (step S2: NO), then the process of the current flowchart is brought to an end.

If the airbag deployment determining unit 46 determines that the airbags 20 have been deployed (step S2: YES), then the integrated control unit 24 judges whether or not the vehicle 12 is in a traveling state based on an output signal from the vehicle velocity detector 26 (step S3).

If it is judged in the integrated control unit 24 that the vehicle is in a stopped state (step S3: NO), then the process of the current flowchart is brought to an end. On the other hand, if it is judged in the integrated control unit 24 that the vehicle is in a traveling state (step S3: YES), the automatic brake control unit 56 carries out the automatic brake control process (step S4).

More specifically, the automatic brake control unit 56 determines a set braking force based on the automatic brake setting map and the vehicle velocity V after the vehicle collision. At this time, the set braking force becomes smaller as the vehicle velocity V is higher. In addition, the automatic brake control unit 56 outputs to the brake actuators 18 automatic brake control signals, which are of a size corresponding to the set braking force. Upon doing so, since the brake actuators 18 output brake pressures having sizes responsive to the size of the automatic brake control signals to the respective brake units 16, predetermined braking forces are generated in each of the wheels 14. Consequently, the vehicle 12 is decelerated automatically at a predetermined deceleration, without reliance on operation of the brake pedal 36 by the driver.

Incidentally, when comparatively large braking forces are generated in the respective wheels 14 under a condition in which the vehicle velocity V is comparatively high after the vehicle collision, there is a concern that the respective wheels 14 may become locked, and that disturbances in the vehicle behavior, such that the vehicle undergoes slipping on the road surface, will take place. However, since the braking force to the respective wheels 14 is made smaller as the vehicle velocity V is higher after the vehicle collision, locking of the wheels 14 and disturbances in the vehicle behavior are suppressed.

Further, in step S4, a maximum value of the set braking force to the wheels 14 may be set to a fixed value regardless of the vehicle velocity V, and a rate of rise of the braking force may be slowed down as the vehicle velocity V immediately after the vehicle collision becomes higher. In this case as well, since the braking force to the wheels 14 becomes smaller as the vehicle velocity V is higher, locking of the wheels 14 and disturbances in the vehicle behavior are suppressed.

Next, the vehicle velocity determiner 48 judges whether or not the vehicle velocity V after a vehicle collision is greater than or equal to the predetermined vehicle velocity V0 (step S5). If the vehicle velocity determiner 48 judges that the vehicle velocity V after the vehicle collision is greater than or equal to the predetermined vehicle velocity V0 (step S5: YES), the antilock brake control process and the vehicle behavior stabilizing control process are made capable of being actuated (step S6). In addition, the integrated control unit 24 determines whether or not the antilock brake control process or the vehicle behavior stabilizing control process has been actuated (step S7).

If it is determined in the integrated control unit 24 that the antilock brake control process or the vehicle behavior stabilizing control process has not been actuated (step S7: NO), then step S4 is returned to and the automatic brake control process continues to be carried out. Accordingly, the vehicle 12 can be decelerated reliably following a vehicle collision.

If the integrated control unit 24 determines that the antilock brake control process or the vehicle behavior stabilizing control process has been actuated (step S7: YES), the automatic brake control unit 56 terminates the automatic brake control process (step S8).

More specifically, if the antilock brake control process has been actuated, the automatic brake control process is stopped, and by output of an ABS control signal to the brake actuators 18, since predetermined braking forces are generated in the wheels 14, locking of the wheels 14 can further be suppressed. Further, if the vehicle behavior stability control process has been actuated, the automatic brake control process is stopped, and by output of a VSA control signal to the brake actuators 18, predetermined braking forces are generated in the wheels 14. Thus, disturbances in the vehicle behavior can further be suppressed.

Thereafter, the antilock brake control process or the vehicle behavior stabilizing control process is terminated (step S9). More specifically, if the antilock brake control process was actuated in step S7, outputting of the ABS control signal to the brake actuators 18 by the antilock brake control unit 52 is stopped, whereby the antilock brake control process is terminated. Further, if the vehicle behavior stabilizing control process was actuated in step S7, outputting of the VSA control signal to the brake actuators 18 by the vehicle behavior stabilizing control unit 54 is stopped, whereby the vehicle behavior stability control process is terminated. At this stage, the process of the current flowchart is brought to an end.

If the vehicle velocity determiner 48 judges that the vehicle velocity V after the vehicle collision is less than the predetermined vehicle velocity V0 (step S5: NO), the antilock brake control process and the vehicle behavior stabilizing control process are prohibited from being actuated (step S10). This is because the vehicle velocity V in this case is considered unlikely to cause disturbances in the vehicle behavior and locking of the wheels 14.

Subsequently, the integrated control unit 24 determines whether or not the driver's own vehicle 12 is stopped, based on an output signal from the vehicle velocity detector 26 (step S11). If it is determined in the integrated control unit 24 that the driver's own vehicle 12 is not stopped (step S11: NO), then step S4 is returned to and the automatic brake control process continues to be carried out.

If it is determined in the integrated control unit 24 that the driver's own vehicle 12 is stopped (step S11: YES), the time judgment unit 50 judges whether or not a measurement time t of the timer 40 has surpassed the braking continuation time t0 (step S12).

If it is determined in the time judgment unit 50 that the measurement time t of the timer 40 has not surpassed the braking continuation time t0 (step S12: NO), then step S4 is returned to and the automatic brake control process continues to be carried out. Consequently, movements of the vehicle 12 contrary to the intention of the driver immediately after the vehicle 12 has stopped can be avoided.

If it is determined in the time judgment unit 50 that the measurement time t of the timer 40 has surpassed the braking continuation time t0 (step S12: YES), the automatic brake control unit 56 terminates the automatic brake control process (step S13). More specifically, the automatic brake control unit 56 stops output of the automatic brake control signals to the brake actuators 18, and the braking forces to the respective wheels 14 are released. Consequently, by operating the vehicle 12, the driver can withdraw the vehicle 12 to a safe location. At this stage, the process of the current flowchart is brought to an end.

According to the present embodiment, since the braking force to the wheels 14 is made smaller as the vehicle velocity V becomes higher after a vehicle collision, the vehicle 12 can be reliably decelerated while also suppressing disturbances in the vehicle behavior and locking of the wheels 14 after a vehicle collision.

Further, in the event that the antilock brake control process or the vehicle behavior stabilizing control process is actuated during operation of the automatic brake control process, the automatic brake control process is stopped, and braking forces applied to the wheels 14 are generated based on the antilock brake control process or the vehicle behavior stabilizing control process. Owing to this feature, even if the automatic brake control process is being carried out after a vehicle collision, the antilock brake control process and the vehicle behavior stabilizing control process can be operated with priority. Consequently, locking of the wheels 14 and disturbances in the vehicle behavior can further be suppressed after a vehicle collision.

Furthermore, in the event that the vehicle velocity V after a collision is greater than or equal to the predetermined vehicle velocity V0 (if the vehicle is in a high velocity region in which it is likely for locking of the wheels 14 or disturbances in the vehicle behavior to occur), since the antilock brake control process and the vehicle behavior stabilizing control process can be actuated, locking of the wheels 14 and disturbances in the vehicle behavior can be suppressed effectively. Further still, in the event that the vehicle velocity V after a collision is less than the predetermined vehicle velocity V0 (if the vehicle is in a low velocity region in which it is unlikely for locking of the wheels 14 or disturbances in the vehicle behavior to occur), since operation of the antilock brake control process and the vehicle behavior stabilizing control process is prohibited while the automatic brake control process is performed, secondary collisions of the vehicle 12 can be suppressed effectively.

The present embodiment is not limited to the structures and methods described above. For example, during the automatic brake control process, in the event that locking of the wheels 14 or disturbances in the vehicle behavior take place, the automatic brake control process may be stopped, and the antilock brake control process or the vehicle behavior stability control process may be operated with priority, regardless of the actual vehicle velocity V after the vehicle collision.

Summary of the First Embodiment

As has been described above, the vehicle control apparatus 10 according to the present embodiment is equipped with the vehicle velocity detecting unit (vehicle velocity detecting unit 26) that detects the vehicle velocity of the driver's own vehicle 12, and the automatic brake control unit 56 that carries out the automatic brake control process for causing braking forces to be generated automatically in the wheels 14 without reliance on a braking operation when the vehicle is involved in a collision. The automatic brake control unit 56 makes the braking force to the wheels 14 smaller as the vehicle velocity becomes higher after a vehicle collision (or immediately after a vehicle collision), which is detected by the vehicle velocity detecting unit.

In the present embodiment, there may further be included the antilock brake control unit 52 that performs an antilock brake control process for suppressing locking of the wheels 14, and the vehicle behavior stabilizing control unit 54 that performs a vehicle behavior stabilizing control process for suppressing disturbances in the vehicle behavior.

Further, in the event that the antilock brake control process or the vehicle behavior stabilizing control process is actuated during the automatic brake control process, the automatic brake control process may be stopped, and braking forces applied to the wheels 14 may be generated based on the antilock brake control process or the vehicle behavior stabilizing control process.

Furthermore, in the event that the vehicle velocity V after a vehicle collision, which is detected by the vehicle velocity detecting unit, is greater than or equal to a predetermined velocity V0, the antilock brake control process and the vehicle behavior stabilizing control process may be made capable of being actuated, whereas in the event that the vehicle velocity V after a vehicle collision, which is detected by the vehicle velocity detecting unit, is less than the predetermined velocity V0, the antilock brake control process and the vehicle behavior stabilizing control process may be prohibited from being actuated.

Second Embodiment

Figure 4:
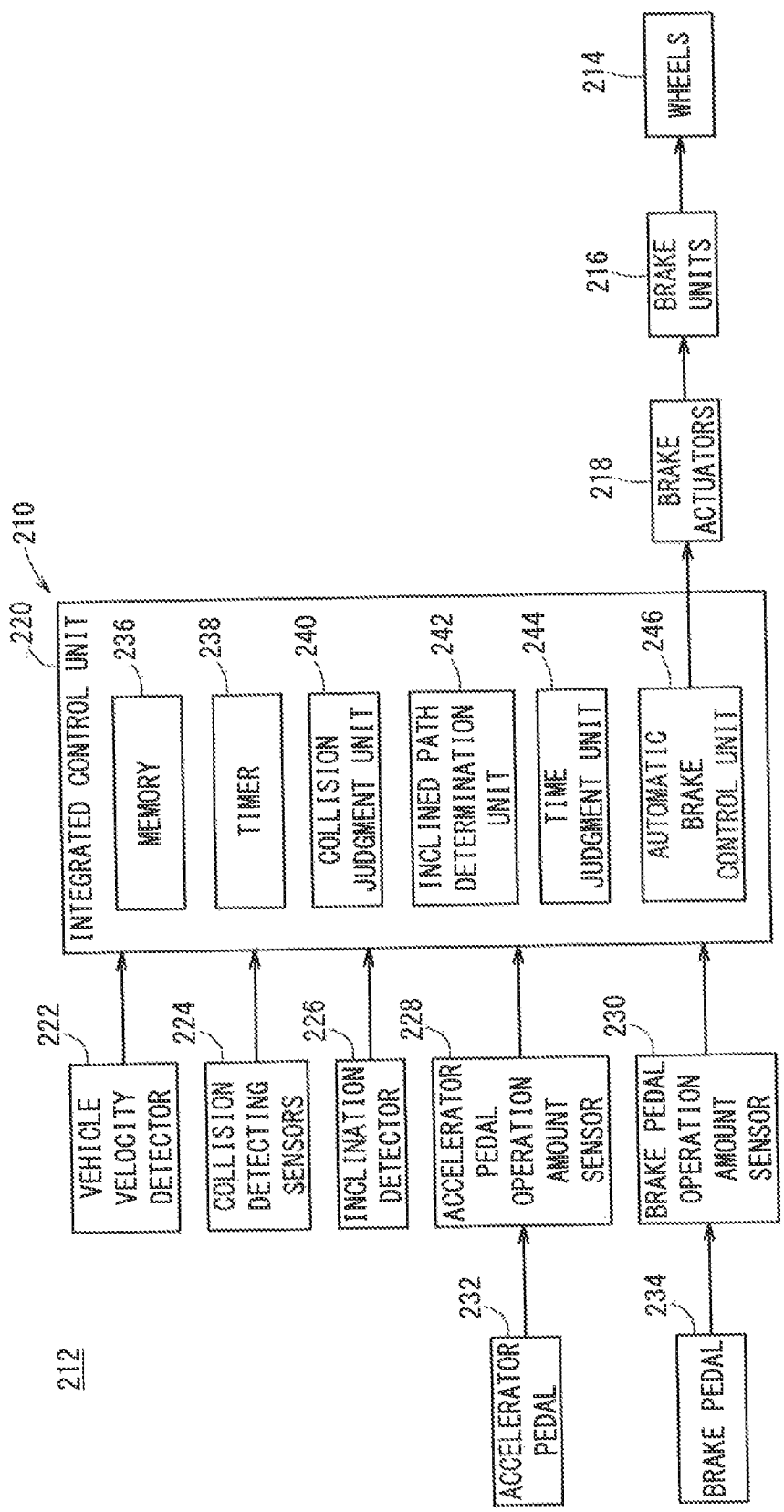
FIG. 4 is a block diagram of a vehicle equipped with a vehicle control apparatus according to a second embodiment of the present invention.

Next, a vehicle control apparatus 210 according to a second embodiment will be described with reference to FIGS. 4 through 6.

A vehicle 212 is constituted as a four-wheeled vehicle having a pair of left and right front wheels and a pair of left and right rear wheels. As shown in FIG. 4, the vehicle 212 is equipped with the vehicle control apparatus 210 that carries out various control processes including an automatic brake control process for respective wheels 214.

The vehicle control apparatus 210 includes four brake units 216 constituted from disk brakes or the like for generating braking forces in the respective wheels 214, brake actuators 218 disposed corresponding to the brake units 216 for controlling the brake pressures (brake hydraulic pressures) therein, and an integrated control unit 220.

The brake actuators 218 generate brake pressures of sizes responsive to an amount by which a brake pedal 234 is operated. Further, the brake actuators 218 generate brake pressures the sizes of which are responsive to automatic brake control signals output from the integrated control unit 220, without reliance on an operation (braking operation) of the brake pedal 234.

Various sensors, including a vehicle velocity detector (vehicle velocity detecting unit) 222, collision detecting sensors 224, an inclination detecting unit (inclination detecting unit) 226, an accelerator pedal operation amount sensor 228, and a brake pedal operation amount sensor 230, etc., are included in the integrated control unit 220.

The vehicle velocity detector 222 can make use of wheel speed sensors provided in each of the wheels 214. In this case, an average value of the wheel speeds detected by the four wheel speed sensors is detected as the vehicle velocity. The collision detecting sensors 224 serve to detect a vehicle collision, and include a pair of left and right front collision detecting sensors disposed on a front frame, a pair of left and right side collision sensors disposed on a center frame, and a pair of left and right rear collision sensors disposed on a rear frame. However, the number of and positions where the collision detection sensors 224 are arranged can be set arbitrarily. The collision detecting sensors 224 can also utilize an acceleration sensor (G sensor), for example.

The inclination detecting unit 226 serves to detect the inclination (inclined state) of the road surface on which the vehicle 212 is positioned, and for example, can make use of a longitudinally arranged acceleration sensor, which detects the angle of inclination of the vehicle 212 in the longitudinal direction thereof, or a navigation device or the like. The accelerator pedal operation amount sensor 228 detects an amount by which an accelerator pedal 232 is operated, and the brake pedal operation amount sensor 230 detects an amount by which the brake pedal 234 is operated.

The integrated control unit 220 is constituted to contain an ECU (Electronic Control Unit). As is widely known, the ECU is a calculator or computational unit containing a microcomputer, and includes a CPU (Central Processing Unit), a memory 236 such as a ROM (Read Only Memory) and a RAM (Random Access Memory), etc., input/output devices such as an A/D converter and a D/A converter, etc., and a timer 238 that serves as a timing unit, etc. The ECU functions as various function realizing sections (function realizing unit), for example, a control unit, an arithmetic unit, and a processing unit or the like, by the CPU reading out and executing programs that are stored in the ROM.

A first braking continuation time ta, a second braking continuation time tb, a third braking continuation time tc, and a fourth braking continuation time td are stored in the memory 236. The first through fourth braking continuation times ta to td are times for which generation of the braking forces applied to the respective wheels 214 continue from stopping of the vehicle after a vehicle collision. In the present embodiment, the second braking continuation time tb is set to be longer than the first braking continuation time ta, and the fourth braking continuation time td is set to be longer than the third braking continuation time tc. Further, the first braking continuation time ta is set to be longer than the third braking continuation time tc, and the second braking continuation time tb is set to be longer than the fourth braking continuation time td. However, the first through fourth braking continuation times ta to td can also be set arbitrarily. The timer 238 measures an elapsed time from stopping of the vehicle following a vehicle collision.

Further, in the integrated control unit 220, a non-illustrated acceleration sensor, such as an orthogonal 3-axis G sensor, a roll rate sensor, a yaw rate sensor, or the like, is provided. By such sensors, the posture and behavior of the driver's own vehicle 212, etc., can be sensed.

The integrated control unit 220 includes a collision judgment unit 240, an inclined path determination unit 242, a time judgment unit 244, and an automatic brake control unit 246.

The collision judgment unit 240 determines whether or not a vehicle collision has occurred based on output signals from the collision detecting sensors 224. More specifically, the collision judgment unit 240 determines whether or not a vehicle collision has occurred together with the collision state (front collision, side collision, rear collision), by comparing the output signals from the collision detecting sensors 224 and an output signal from the orthogonal 3-axis G sensor.

The inclined path determination unit 242 determines if the driver's own vehicle 212 is positioned on either one of an uphill slope or a downhill slope at the time of a vehicle collision, based on an output signal from the inclination detecting unit 226. The time judgment unit 244 judges whether or not a measurement time t of the timer 238 has surpassed the first through fourth braking continuation times ta to td.

The automatic brake control unit 246 outputs brake control signals (automatic brake control signals) to the brake actuators 218 at the time of a vehicle collision, whereby an automatic brake control process is carried out for automatically generating predetermined braking forces in the wheels 214 without reliance on an operation of the brake pedal 234 by the driver.

The vehicle 212, which is equipped with the vehicle control apparatus 210 according to the present embodiment, is constructed basically as described above. Next, a description will be given concerning the brake control process performed by the vehicle control apparatus 210.

Figure 5:
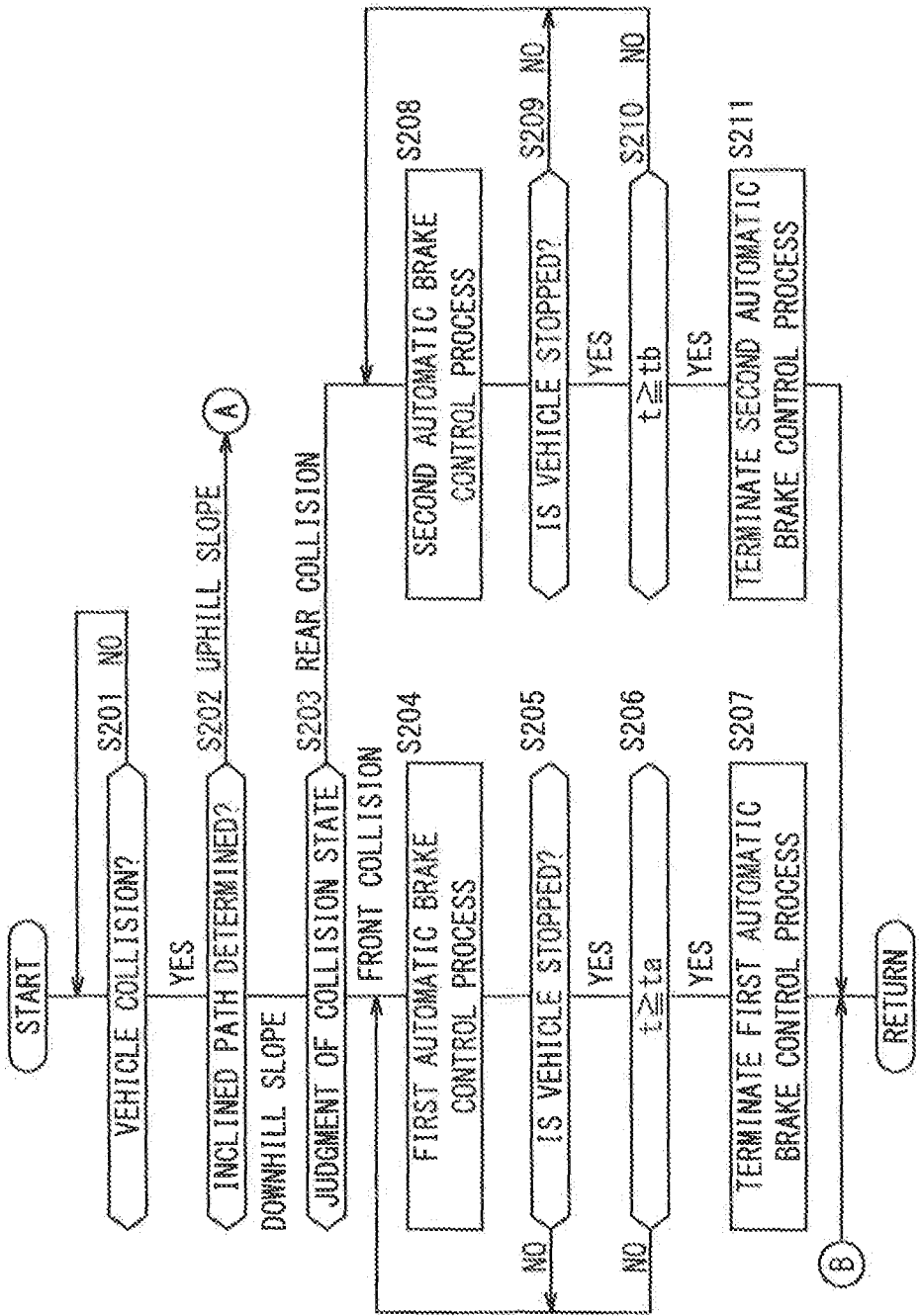
FIG. 5 is a first flowchart for describing an automatic brake control process performed by the vehicle control apparatus shown in FIG. 4.

As shown in FIG. 5, at first, the collision judgment unit 240 determines whether or not a vehicle collision has occurred based on output signals from the collision detecting sensors 224 (step S201). If it is judged by the collision judgment unit 240 that a vehicle collision has not occurred (step S201: NO), then the process of step S201 is repeated.

If it is judged by the collision judgment unit 240 that a vehicle collision has occurred (step S201: YES), the inclined path determination unit 242 determines if the vehicle is positioned on either one of an uphill slope or a downhill slope at the time of the vehicle collision (step S202).

If the inclined path determination unit 242 has determined the existence of a downhill slope, the collision judgment unit 240 judges whether the collision state is either a front collision (head-on collision) or a rear collision (rear-end collision) (step S203). If it is determined by the collision judgment unit 240 that the collision state is a front collision, the automatic brake control unit 246 performs a first automatic brake control process (step S204).

More specifically, the automatic brake control unit 246 outputs to the brake actuators 218 first automatic brake control signals. Upon doing so, since the brake actuators 218 output first brake pressures, which have sizes corresponding to the size of the first automatic brake control signals, to the respective brake units 216, first braking forces are generated in each of the wheels 214. Consequently, the vehicle 212 is decelerated automatically at a predetermined first deceleration, without reliance on operation of the brake pedal 234 by the driver.

In the case of being hit from the front on a downhill slope, since the vehicle 212 is accelerated by gravity, a faster vehicle velocity tends to result, compared to the case of a vehicle collision that takes place on an uphill slope. For this reason, the first braking force is greater than a third braking force and a fourth braking force, to be described later, for the case in which the vehicle collision takes place on an uphill slope. Consequently, the vehicle 212 can be decelerated efficiently if the vehicle 212 is hit from the front on a downhill slope.

In addition, the integrated control unit 220 determines whether or not the driver's own vehicle 212 is stopped, based on an output signal from the vehicle velocity detector 222 (step S205). If it is determined in the integrated control unit 220 that the driver's own vehicle 212 is not stopped (step S205: NO), then step S204 is returned to, and the automatic brake control unit 246 continues to carry out the first brake control process.

If it is determined in the integrated control unit 220 that the driver's own vehicle 212 is stopped (step S205: YES), the time judgment unit 244 judges whether or not a measurement time t of the timer 238 has surpassed the first braking continuation time ta (step S206).

If it is determined in the time judgment unit 244 that the measurement time t of the timer 238 has not surpassed the first braking continuation time ta (step S206: NO), then step S204 is returned to, and the automatic brake control unit 246 continues to carry out the first automatic brake control process. Consequently, movements of the vehicle 212 contrary to the intention of the driver immediately after the vehicle 212 has stopped can be avoided.

If it is determined in the time judgment unit 244 that the measurement time t of the timer 238 has surpassed the first braking continuation time ta (step S206: YES), the automatic brake control unit 246 terminates the first automatic brake control process (step S207). More specifically, the automatic brake control unit 246 stops output of the first automatic brake control signals to the brake actuators 218, and the first braking forces to the respective wheels 214 are released. Consequently, by operating the vehicle 212, the driver can withdraw the vehicle 212 to a safe location. At this stage, the process of the current flowchart is brought to an end.

In step S203, if it is determined by the collision judgment unit 240 that the collision state is a rear collision, the automatic brake control unit 246 performs a second automatic brake control process (step S208).

More specifically, the automatic brake control unit 246 outputs to the brake actuators 218 second automatic brake control signals. Upon doing so, since the brake actuators 218 output second brake pressures, which have sizes corresponding to the size of the second automatic brake control signals, to the respective brake units 216, second braking forces are generated in each of the wheels 214. In this case, since the second automatic brake control signals are smaller than the first automatic brake control signals, the second braking forces are smaller than the first braking forces. Consequently, the vehicle 212 is decelerated at a second deceleration, which is smaller than the first deceleration, without reliance on operation of the brake pedal 234 by the driver.

In the case of being hit from behind on a downhill slope, since the vehicle 212 is accelerated by gravity, a faster vehicle velocity tends to result, compared to the case of a vehicle collision that takes place on an uphill slope. For this reason, the second braking force is greater than the third braking force and the fourth braking force, to be described later, for the case in which the vehicle collision takes place on an uphill slope. Consequently, the vehicle 212 can be decelerated efficiently if the vehicle 212 is hit from behind on a downhill slope.

Further, in the case of being hit from behind on a downhill slope, since the vehicle 212 receives energy from the collision and is accelerated, a faster vehicle velocity tends to result, compared to the case of being hit from the front on a downhill slope. Therefore, for example, when the second braking force in the case of being hit from behind on a downhill slope is made greater than the first braking force in the case of being hit from the front on a downhill slope, since a large inertial force acts on the occupant based on the second braking force, the posture of the occupant is easily subjected to turbulence (tending to result in a forwardly plunging posture) together with a large load being applied to the occupant from the seatbelt.

However, according to the present embodiment, because the second braking force in the case of being hit from behind on a downhill slope is smaller than the first braking force in the case of being hit from the front on a downhill slope, the load being applied to the occupant from the seatbelt is made smaller and a disturbance to the posture of the occupant can be suppressed. Consequently, in the case that the airbag is deployed, it is possible for the shock absorbing effect of the airbag with respect to the occupant to be exhibited efficiently.

Thereafter, based on an output signal from the vehicle velocity detector 222, the integrated control unit 220 determines whether or not the driver's own vehicle 212 has stopped (step S209). If it is determined in the integrated control unit 220 that the driver's own vehicle 212 is not stopped (step S209: NO), then step S208 is returned to, and the automatic brake control unit 246 continues to carry out the second brake control process.

If it is determined in the integrated control unit 220 that the driver's own vehicle 212 is stopped (step S209: YES), the time judgment unit 244 judges whether or not a measurement time t of the timer 238 has surpassed the second braking continuation time tb (step S210).

If it is determined in the time judgment unit 244 that the measurement time t of the timer 238 has not surpassed the second braking continuation time tb (step S210: NO), then step S208 is returned to, and the automatic brake control unit 246 continues to carry out the second automatic brake control process. Consequently, downhill movement of the vehicle 212 due to a creep phenomenon immediately after stopping of the vehicle 212 can be avoided. Further, secondary collisions caused by mistaken vehicle operations by the driver immediately after the vehicle 212 has stopped can be prevented.

If it is determined in the time judgment unit 244 that the measurement time t of the timer 238 has surpassed the second braking continuation time tb (step S210: YES), the automatic brake control unit 246 terminates the second automatic brake control process (step S211). More specifically, the automatic brake control unit 246 stops output of the second automatic brake control signals to the brake actuators 218, and the second braking forces to the respective wheels 214 are released. Consequently, by operating the vehicle 212, the driver can withdraw the vehicle 212 to a safe location. At this stage, the process of the current flowchart is brought to an end.

Figure 6:
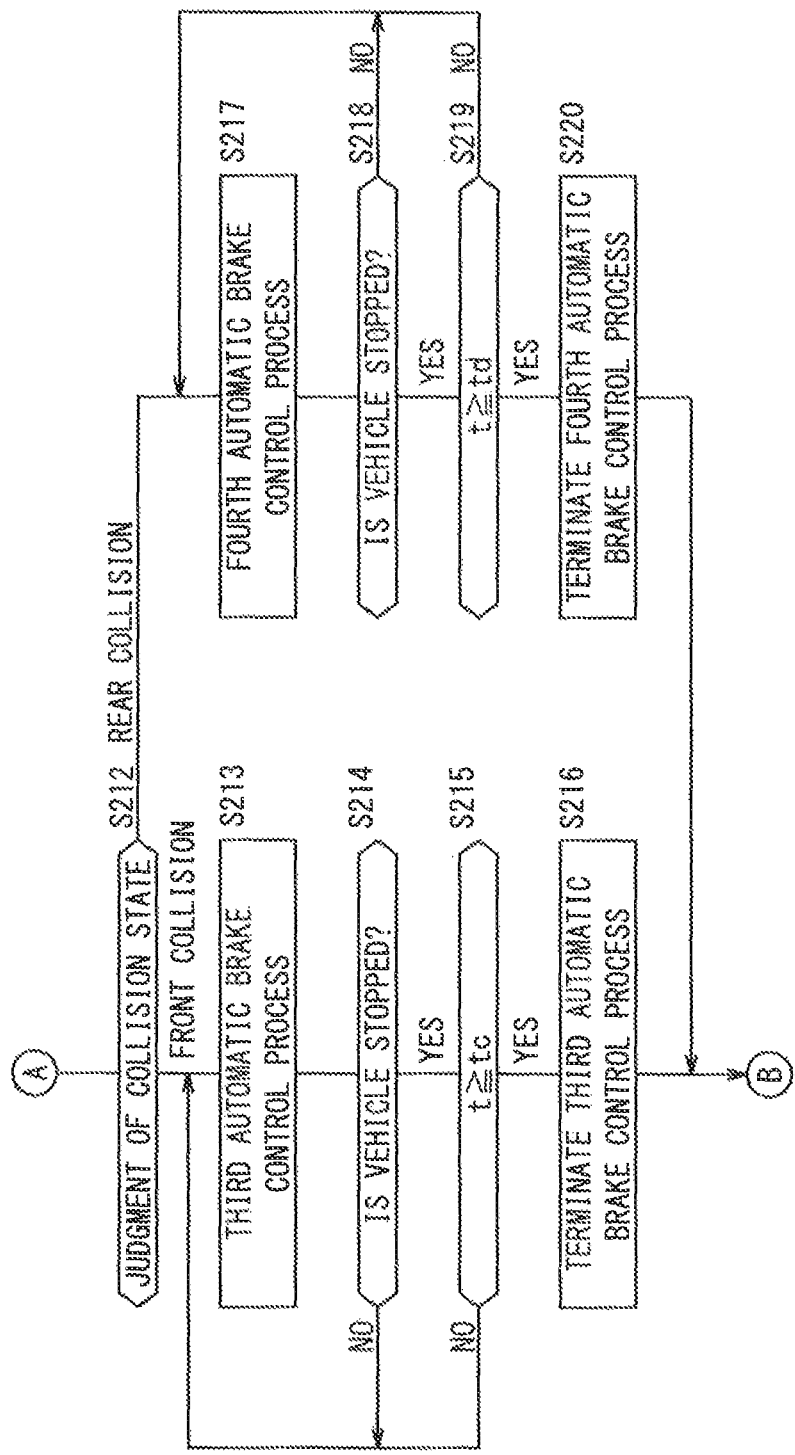
FIG. 6 is a second flowchart for describing an automatic brake control process performed by the vehicle control apparatus shown in FIG. 4.

In step S202, if it is determined by the inclined path determination unit 242 that the vehicle 212 is positioned on an uphill slope at the time of the vehicle collision, then the collision judgment unit 240 judges whether the vehicle collision is either a front collision or a rear collision (step S212 of FIG. 6). If it is determined by the collision judgment unit 240 that the collision state is a front collision, the automatic brake control unit 246 performs a third automatic brake control process (step S213).

More specifically, the automatic brake control unit 246 outputs to the brake actuators 218 third automatic brake control signals. Upon doing so, since the brake actuators 218 output third brake pressures, which have sizes corresponding to the size of the third automatic brake control signals, to the respective brake units 216, third braking forces are generated in each of the wheels 214. In this case, since the third automatic brake control signals are smaller than the second automatic brake control signals, the third braking forces are smaller than the second braking forces. Consequently, the vehicle 212 is decelerated at a third deceleration, which is smaller than the second deceleration, without reliance on operation of the brake pedal 234 by the driver.

In the case of being hit from the front on an uphill slope, since the vehicle 212 is decelerated by gravity, a slower vehicle velocity tends to result, compared to the case of a vehicle collision that takes place on a downhill slope. For this reason, the third braking force is less than the first braking force and the second braking force for the case in which the vehicle collision takes place on a downhill slope. Consequently, the vehicle 212 can be decelerated efficiently if the vehicle 212 is hit from the front on an uphill slope, while in addition, loads applied to the occupant from the seatbelt can be made smaller, and disturbances to the posture of the occupant can be suppressed.

Subsequently, the integrated control unit 220 determines whether or not the driver's own vehicle 212 is stopped, based on an output signal from the vehicle velocity detector 222 (step S214). If it is determined in the integrated control unit 220 that the driver's own vehicle 212 is not stopped (step S214: NO), then step S213 is returned to, and the automatic brake control unit 246 continues to carry out the third brake control process.

If it is determined in the integrated control unit 220 that the driver's own vehicle 212 is stopped (step S214: YES), the time judgment unit 244 judges whether or not a measurement time t of the timer 238 has surpassed the third braking continuation time tc (step S215).

If it is determined in the time judgment unit 244 that the measurement time t of the timer 238 has not surpassed the third braking continuation time tc (step S215: NO), then step S213 is returned to, and the automatic brake control unit 246 continues to carry out the third automatic brake control process. As a result, secondary collisions caused by mistaken vehicle operations by the driver immediately after the vehicle 212 has stopped can be prevented.

If it is determined in the time judgment unit 244 that the measurement time t of the timer 238 has surpassed the third braking continuation time tc (step S215: YES), the automatic brake control unit 246 terminates the third automatic brake control process (step S216). More specifically, the automatic brake control unit 246 stops output of the third automatic brake control signals to the brake actuators 218, and the third braking forces to the respective wheels 214 are released. Consequently, by operating the vehicle 212, the driver can withdraw the vehicle 212 to a safe location. At this stage, the process of the current flowchart is brought to an end.

In step S212, if it is determined by the collision judgment unit 240 that the collision state is a rear collision, the automatic brake control unit 246 performs a fourth automatic brake control process (step S217).

More specifically, the automatic brake control unit 246 outputs to the brake actuators 218 fourth automatic brake control signals. Upon doing so, since the brake actuators 218 output fourth brake pressures, which have sizes corresponding to the size of the fourth automatic brake control signals, to the respective brake units 216, fourth braking forces are generated in each of the wheels 214. In this case, since the fourth automatic brake control signals are larger than the third automatic brake control signals, the fourth braking forces are greater than the third braking forces. The fourth braking forces, for example, can be set to braking forces (brake pressures) such that the vehicle deceleration becomes 0.5 G. Note that 1 G is equivalent to 9.8 m/s$^2$. However, the fourth braking forces can also be set arbitrarily. Consequently, the vehicle 212 is decelerated at a fourth deceleration, which is greater than the third deceleration, without reliance on operation of the brake pedal 234 by the driver.

In the case of being hit from behind on an uphill slope, since the vehicle 212 is decelerated by gravity, a slower vehicle velocity tends to result, compared to the case of a vehicle collision that takes place on a downhill slope. For this reason, the fourth braking force is less than the first braking force and the second braking force for the case in which the vehicle collision takes place on a downhill slope. Further, in the case of being hit from behind on an uphill slope, since the vehicle 212 receives energy from the collision and is accelerated, a faster vehicle velocity tends to result, compared to the case of being hit from the front on an uphill slope. For this reason, the fourth braking force is greater than the third braking force for the case in which a front collision takes place on an uphill slope. Consequently, the vehicle 212 can be decelerated efficiently if the vehicle 212 is hit from the front on an uphill slope, while in addition, loads applied to the occupant from the seatbelt can be made smaller, and disturbances to the posture of the occupant can be suppressed.

Subsequently, the integrated control unit 220 determines whether or not the driver's own vehicle 212 is stopped, based on an output signal from the vehicle velocity detector 222 (step S218). If it is determined in the integrated control unit 220 that the driver's own vehicle 212 is not stopped (step S218: NO), then step S217 is returned to, and the automatic brake control unit 246 continues to carry out the fourth brake control process.

If it is determined in the integrated control unit 220 that the driver's own vehicle 212 is stopped (step S218: YES), the time judgment unit 244 judges whether or not a measurement time t of the timer 238 has surpassed the fourth braking continuation time td (step S219).

If it is determined in the time judgment unit 244 that the measurement time t of the timer 238 has not surpassed the fourth braking continuation time td (step S219: NO), then step S217 is returned to, and the automatic brake control unit 246 continues to carry out the fourth automatic brake control process. As a result, secondary collisions caused by mistaken vehicle operations by the driver immediately after the vehicle 212 has stopped can be prevented.

If it is determined in the time judgment unit 244 that the measurement time t of the timer 238 has surpassed the fourth braking continuation time td (step S219: YES), the automatic brake control unit 246 terminates the fourth automatic brake control process (step S220). More specifically, the automatic brake control unit 246 stops output of the fourth automatic brake control signals to the brake actuators 218, and the fourth braking forces to the respective wheels 214 are released. Consequently, by operating the vehicle 212, the driver can withdraw the vehicle 212 to a safe location. At this stage, the process of the current flowchart is brought to an end.

According to the present embodiment, the braking forces (first braking force and second braking force) of the wheels 214 in the case of a vehicle collision on a downhill slope are greater than the braking forces (third braking force and fourth braking force) of the wheels 214 in the case of a vehicle collision on an uphill slope. More specifically, if a vehicle collision takes place on a downhill slope, since a comparatively large braking force is generated in the wheels 214, the vehicle 212 can be efficiently decelerated after the vehicle collision. Further, if the vehicle collision takes place on an uphill slope, since a comparatively small braking force is generated in the wheels 214, the load that is imparted to the occupant from the seat belt can be suppressed.

Further, the second braking force to the wheels 214 in the case of being hit from behind on a downhill slope is made smaller than the first braking force to the wheels 214 in the case of being hit from the front on a downhill slope. Therefore, even if the vehicle 212 is accelerated after a vehicle collision by being hit from behind on a downhill slope and receiving energy from the collision, the load imparted to the occupant from the seat belt can be suppressed.

Furthermore, the second braking continuation time tb for which the second braking force continues to be generated from stopping of the vehicle in the case of being hit from behind on a downhill slope is longer than the fourth braking continuation time td for which the fourth braking force continues to be generated from stopping of the vehicle in the case of being hit from behind on an uphill slope. Therefore, in the case of a rear collision occurring on a downhill slope, it is possible to prevent the vehicle 212 from moving due to a creep phenomenon.

The present embodiment is not limited to the configuration described above. For example, the vehicle control apparatus 210 according to the present embodiment may include configurations and functions that have not been particularly specified for this embodiment, which are included among those of the vehicle control apparatus 10 according to the above-described first embodiment. In other words, the automatic brake control unit 246 may make the braking force to the wheels 214 smaller as the vehicle velocity becomes higher after a vehicle collision (or immediately after a vehicle collision), which is detected by the vehicle velocity detector 222.

Summary of the Second Embodiment

As has been described above, the vehicle control apparatus 210 according to the second embodiment is equipped with the inclination detecting unit (inclination detecting unit 226) that detects the inclination of the road surface on which the driver's own vehicle 212 is positioned at the time of a vehicle collision, and the automatic brake control unit 246 that causes braking forces to be generated automatically in the wheels 214 without reliance on a braking operation when the vehicle is involved in a collision.

The automatic brake control unit 246 causes the braking force to the wheels 214 in the case that the driver's own vehicle 212 is positioned on a downhill slope at the time of the collision to be greater than a braking force to the wheels 214 in the case that the driver's own vehicle 212 is positioned on an uphill slope at the time of the collision.

In the present embodiment, the automatic brake control unit 246 may cause the braking force to the wheels 214 in the case that the driver's own vehicle 212 is hit from behind on the downhill slope to be smaller than a braking force to the wheels 214 in the case that the driver's own vehicle 212 is hit from the front on the downhill slope.

In the present embodiment, the automatic brake control unit 246 may continue to generate the braking force applied to the wheels 214 until a predetermined braking continuation time has elapsed from stopping of the vehicle after the vehicle collision. In addition, the braking continuation time (second braking continuation time tb) in the case that the driver's own vehicle 212 is hit from behind on a downhill slope is made longer than the braking continuation time (fourth braking continuation time td) in the case that the driver's own vehicle 212 is hit from behind on an uphill slope.

Third Embodiment

Figure 7:
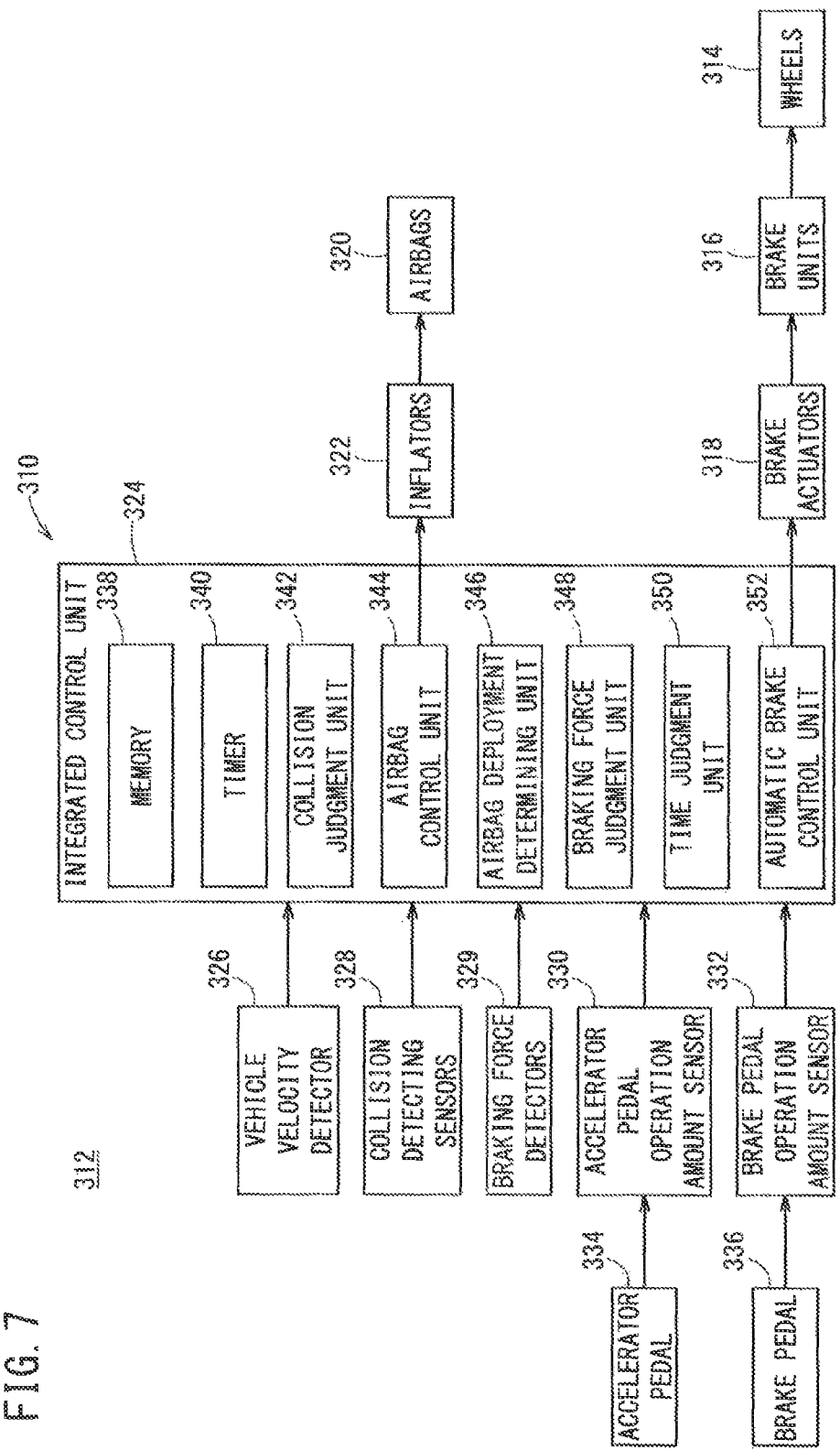
FIG. 7 is a block diagram of a vehicle equipped with a vehicle control apparatus according to a third embodiment of the present invention.

Next, a vehicle control apparatus 310 according to a third embodiment will be described with reference to FIGS. 7 and 8.

A vehicle 312 is constituted as a four-wheeled vehicle having a pair of left and right front wheels and a pair of left and right rear wheels. As shown in FIG. 7, the vehicle 312 is equipped with the vehicle control apparatus 310 that carries out various control processes including an automatic brake control process for respective wheels 314.

The vehicle control apparatus 310 includes four brake units 316 constituted from disk brakes or the like for generating braking forces in the respective wheels 314, brake actuators 318 disposed corresponding to the brake units 316 for controlling the brake pressures (brake hydraulic pressures) therein, an inflator 322 that serves to deploy an airbag 320, and an integrated control unit 324.

The brake actuators 318 generate brake pressures of sizes responsive to an amount by which a brake pedal 336 is operated. Further, the brake actuators 318 generate brake pressures the sizes of which are responsive to automatic brake control signals output from the integrated control unit 324, without reliance on an operation of the brake pedal 336.

The airbags 320 include a driver's seat front airbag, a passenger seat front airbag, side airbags, side curtain airbags, and an airbag for pedestrians, etc. The inflator 322 serves to generate a gas for the purpose of deploying the airbags 320, and may be provided respectively corresponding to each of the airbags 320.

Various sensors, including a vehicle velocity detector (vehicle velocity detecting unit) 326, collision detecting sensors 328, braking force detectors (braking force detecting unit) 329, an accelerator pedal operation amount sensor 330, and a brake pedal operation amount sensor 332, etc., are included in the integrated control unit 324.

The vehicle velocity detector 326 can make use of, e.g., wheel speed sensors provided in each of the wheels 314. In this case, an average value of the wheel speeds detected by the four wheel speed sensors is detected as the vehicle velocity. The collision detecting sensors 328 serve to detect a vehicle collision, and include a pair of left and right front collision detecting sensors disposed on a front frame, a pair of left and right side collision sensors disposed on a center frame, and a pair of left and right rear collision sensors disposed on a rear frame. However, the number of and positions where the collision detection sensors 328 are arranged can be set arbitrarily.

The braking force detectors 329 detect the braking forces generated in each of the wheels 314. The collision detecting sensors 328 and the braking force detectors 329 can utilize an acceleration sensor (G sensor), for example. The accelerator pedal operation amount sensor 330 detects an amount by which an accelerator pedal 334 is operated, and the brake pedal operation amount sensor 332 detects an amount by which the brake pedal 336 is operated.

The integrated control unit 324 is constituted to contain an ECU (Electronic Control Unit). As is widely known, the ECU is a calculator or computational unit containing a microcomputer, and includes a CPU (Central Processing Unit), a memory 338 such as a ROM (Read Only Memory) and a RAM (Random Access Memory), etc., input/output devices such as an A/D converter and a D/A converter, etc., and a timer 340 that serves as a timing unit, etc. The ECU functions as various function realizing sections (function realizing unit), for example, a control unit, an arithmetic unit, and a processing unit or the like, by the CPU reading out and executing programs that are stored in the ROM.

In the memory 338 are stored target braking forces B0, and a braking continuation time t0. Although the target braking forces B0 can be set arbitrarily, the target braking forces B0 may be set such that the vehicle deceleration becomes 0.5 G, for example. Note that 1 G is equivalent to 9.8 m/s$^2$. However, the target braking forces B0 can also be set arbitrarily. The braking continuation time t0 is a time for which generation of the braking forces applied to the respective wheels 314 continues from stopping of the vehicle after a vehicle collision. The braking continuation time t0 can also be set arbitrarily. The timer 340 measures an elapsed time from stopping of the vehicle following a vehicle collision.

Further, in the integrated control unit 324, a non-illustrated acceleration sensor, such as an orthogonal 3-axis G sensor, a roll rate sensor, a yaw rate sensor, or the like, is provided. By such sensors, the posture, behavior, and the like of the driver's own vehicle 312 can be sensed.

The integrated control unit 324 includes a collision judgment unit 342, an airbag control unit 344, an airbag deployment determining unit 346, a braking force judgment unit 348, a time judgment unit 350, and an automatic brake control unit 352.

The collision judgment unit 342 determines whether or not a vehicle collision has occurred based on output signals from the collision detecting sensors 328. More specifically, the collision judgment unit 342 determines whether or not a vehicle collision has occurred together with the collision state (front collision, side collision, rear collision), by comparing the output signals from the collision detecting sensors 328 and an output signal from the orthogonal 3-axis G sensor.

The airbag control unit 344 controls deployment and non-deployment of the airbags 320. Stated otherwise, the inflators 322 are controlled in order to deploy the airbags 320 based on output signals from the collision detecting sensors 328 and the collision state that is determined by the collision judgment unit 342. More specifically, the airbag control unit 344 does not deploy the airbags 320 in the case that the output signals from the collision detecting sensors 328 are less than or equal to a given threshold value (if the collision energy is comparatively small), and deploys the airbags 320 responsive to the collision state in the case that the output signals from the collision detecting sensors 328 exceed the threshold value.

The airbag deployment determining unit 346 determines whether or not the airbags 320 have been deployed (deployment condition of the airbag 320) based on an output signal from the airbag control unit 344 to the inflator 322.

The braking force judgment unit 348 judges whether or not the braking forces to the respective wheels 314 performed by the automatic brake control process have reached the target braking force B0. The time judgment unit 350 judges whether or not a measurement time t of the timer 340 has surpassed a braking continuation time t0.

The automatic brake control unit 352 outputs brake control signals (automatic brake control signals) to the brake actuators 318 at the time of a vehicle collision, whereby an automatic brake control process is carried out for automatically generating predetermined braking forces in the wheels 314 without reliance on an operation (braking operation) of the brake pedal 336 by the driver.

The vehicle 312, which is equipped with the vehicle control apparatus 310 according to the present embodiment, is constructed basically as described above. Next, a description will be given concerning the brake control process performed by the vehicle control apparatus 310.

Figure 8:
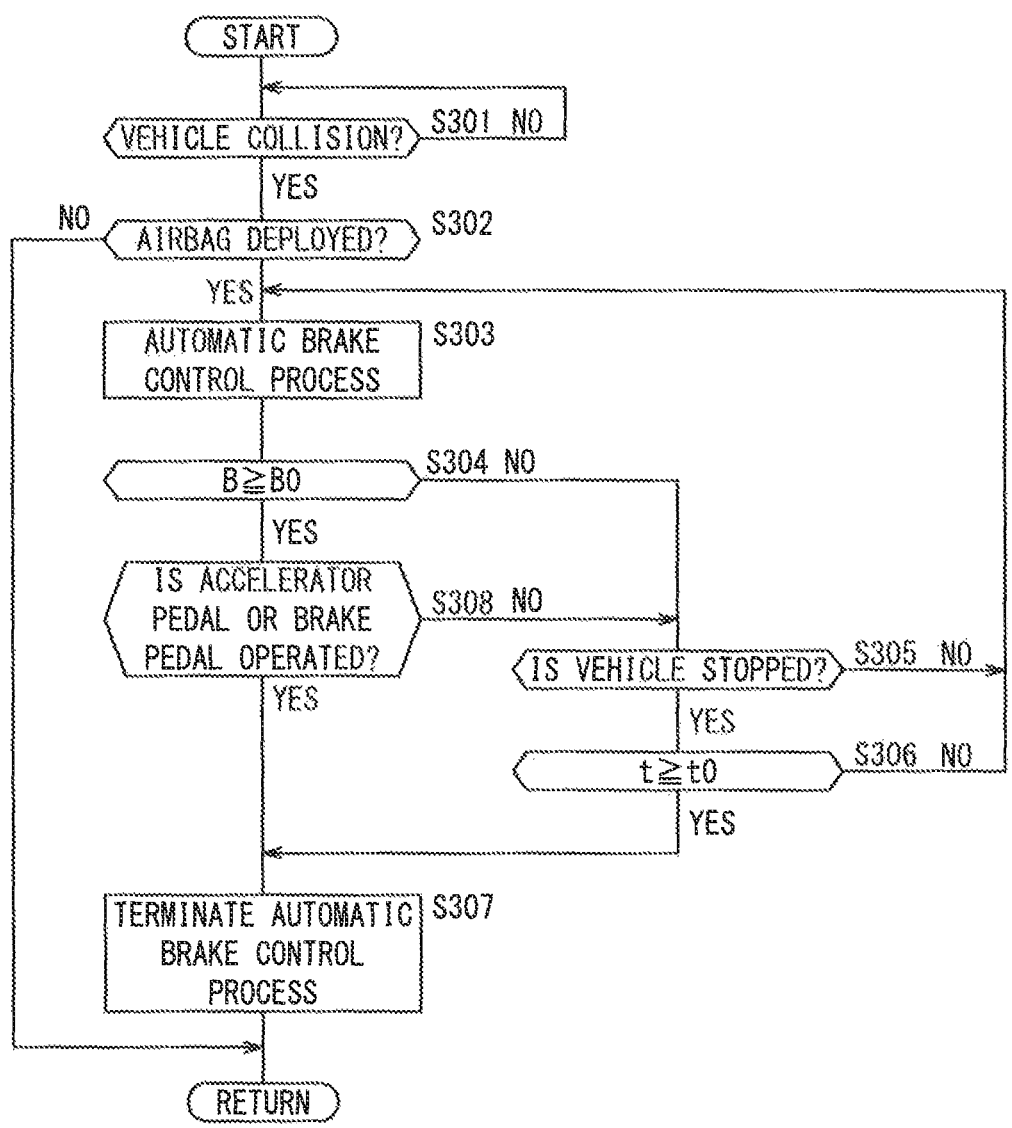
FIG. 8 is a flowchart for describing an automatic brake control process performed by the vehicle control apparatus shown in FIG. 7.

As shown in FIG. 8, at first, the collision judgment unit 342 determines whether or not a vehicle collision has occurred based on output signals from the collision detecting sensors 328 (step S301). If it is judged by the collision judgment unit 342 that a vehicle collision has not occurred (step S301: NO), then the process of step S301 is repeated.

If it is judged by the collision judgment unit 342 that a vehicle collision has occurred (step S301: YES), then the airbag control unit 344 does not deploy the airbags 320 in the case that the output signals from the collision detecting sensors 328 are less than or equal to a given threshold value, and deploys the airbags 320 responsive to the collision state in the case that the output signals from the collision detecting sensors 328 exceed the threshold value.

In addition, the airbag deployment determining unit 346 determines whether or not the airbags 320 have been deployed (deployment condition of the airbags 320) (step S302). If the airbag deployment determining unit 346 has determined that the airbags 320 are not deployed (step S302: NO), then the process of the current flowchart is brought to an end.

If it is judged in the airbag deployment determining unit 346 that the airbags 320 have been deployed (step S302: YES), the automatic brake control unit 352 carries out the automatic brake control process (step S303).

More specifically, the automatic brake control unit 352 outputs automatic brake control signals to the brake actuators 318. Upon doing so, since the brake actuators 318 output brake pressures, which have sizes corresponding to the size of the automatic brake control signals, to the respective brake units 316, braking forces are generated in each of the wheels 314. Consequently, the vehicle 312 is decelerated automatically at a predetermined deceleration, without reliance on operation of the brake pedal 336 by the driver.

In addition, the braking force judgment unit 348 judges whether or not the braking forces B of the respective wheels 314, which are detected by the braking force detectors 329, have reached the target braking force B0 (step S304). If it is determined in the braking force judgment unit 348 that the braking forces B have not reached the target braking force B0 (step S304: NO), then the integrated control unit 324 judges whether or not the driver's own vehicle 312 is stopped based on an output signal from the vehicle velocity detector 326 (step S305). If it is determined in the integrated control unit 324 that the driver's own vehicle 312 is not stopped (step S305: NO), then step S303 is returned to, and the automatic brake control unit 352 continues to carry out the automatic brake control process. More specifically, the automatic brake control unit 352 continues the automatic brake control process such that the braking forces B of each of the wheels 314 arrive at the target braking force B0, regardless of operations of the accelerator pedal 334 or the brake pedal 336.

If it is determined in the integrated control unit 324 that the driver's own vehicle 312 is stopped (step S305: YES), the time judgment unit 350 judges whether or not a measurement time t of the timer 340 has surpassed the braking continuation time t0 (step S306).

If it is determined in the time judgment unit 350 that the measurement time t of the timer 340 has not surpassed the braking continuation time t0 (step S306: NO), then step S303 is returned to, and the automatic brake control unit 352 continues to carry out the automatic brake control process. Consequently, movements of the vehicle 312 contrary to the intention of the driver immediately after the vehicle 312 has stopped can be avoided.

If it is determined in the time judgment unit 350 that the measurement time t of the timer 340 has surpassed the braking continuation time t0 (step S306: YES), the automatic brake control unit 352 terminates the automatic brake control process (step S307). More specifically, the automatic brake control unit 352 stops output of the automatic brake control signals to the brake actuators 318, and the braking forces to the respective wheels 314 are released. Consequently, by operating the vehicle 312, the driver can withdraw the vehicle 312 to a safe location. Further, for example, even if an abnormality occurs in the brake system due to the influence of the vehicle collision, such that only a braking force that is smaller than the target braking force B0 can be generated, the automatic brake control process can be terminated in a safe state. At this stage, the process of the current flowchart is brought to an end.

If it is determined in the braking force judgment unit 348 that the braking forces B have reached the target braking force B0 (step S304: YES), then the integrated control unit 324 judges whether or not the accelerator pedal 334 or the brake pedal 336 has been operated (step S308). Whether or not the accelerator pedal 334 has been operated is determined based on an output signal from the accelerator pedal operation amount sensor 330, and whether or not the brake pedal 336 has been operated is determined based on an output signal from the brake pedal operation amount sensor 332.

If it is determined by the integrated control unit 324 that the accelerator pedal 334 or the brake pedal 336 has been operated (step S308: YES), the automatic brake control unit 352 terminates the automatic brake control process (step S307). At this stage, the process of the current flowchart is brought to an end.

On the other hand, if it is determined by the integrated control unit 324 that the accelerator pedal 334 or the brake pedal 336 has not been operated (step S308: NO), then the processes of the aforementioned step S305 and those thereafter are carried out. More specifically, the integrated control unit 324 determines whether or not the driver's own vehicle 312 is stopped, based on an output signal from the vehicle velocity detector 326 (step S305). In addition, if it is determined in the integrated control unit 324 that the driver's own vehicle 312 is not stopped (step S305: NO), then step S303 is returned to, and the automatic brake control unit 352 continues to carry out the automatic brake control process. If it is determined in the integrated control unit 324 that the driver's own vehicle 312 is stopped (step S305: YES), the time judgment unit 350 judges whether or not a measurement time t of the timer 340 has surpassed the braking continuation time t0 (step S306).

If it is determined in the time judgment unit 350 that the measurement time t of the timer 340 has not surpassed the braking continuation time t0 (step S306: NO), then step S303 is returned to, and the automatic brake control unit 352 continues to carry out the automatic brake control process. If it is determined in the time judgment unit 350 that the measurement time t of the timer 340 has surpassed the braking continuation time t0 (step S306: YES), the automatic brake control unit 352 terminates the automatic brake control process (step S307). At this stage, the process of the current flowchart is brought to an end.

According to the present embodiment, even in the event that the accelerator pedal 334 or the brake pedal 336 is operated during the automatic brake control process at the time of a vehicle collision, the automatic brake control process is continued until the braking forces B detected by the braking force detectors 329 reach the target braking force B0 (braking forces continue to be generated in each of the wheels 314). Consequently, the braking forces to the wheels 314 can reliably be made to increase to the target braking force B0, while avoiding the automatic brake control process from being stopped by a mistaken operation of the accelerator pedal 334 or the brake pedal 336 when the vehicle is involved in a collision.

Further, if the vehicle 312 is stopped without the braking force B detected by the braking force detectors 329 having reached the target braking force B0, the automatic brake control process is terminated after the elapse of a predetermined braking continuation time t0 from stopping of the vehicle. Consequently, for example, even if an abnormality occurs in the brake system due to the influence of the vehicle collision, such that only a braking force that is smaller than the target braking force B0 can be generated, the automatic brake control process can be terminated in a safe state.

The automatic brake control process of the vehicle control apparatus 310 according to present embodiment is not limited to the examples described above. For example, if the airbag deployment determining unit 346 has determined that the airbags 320 are not deployed (step S302: NO), the automatic brake control unit 352 may carry out the (automatic brake control) process of step S303 and the steps thereafter.

Further, for example, the vehicle control apparatus 310 according to the present embodiment may include configurations and functions that have not been particularly specified for this embodiment, and which are included among those of the vehicle control apparatus 10 according to the above-described first embodiment. In other words, the automatic brake control unit 352 may make the braking force to the wheels 314 smaller as the vehicle velocity becomes higher after a vehicle collision (or immediately after a vehicle collision), which is detected by the vehicle velocity detector 326.

Summary of the Third Embodiment

As has been described above, the vehicle control apparatus 310 includes the automatic brake control unit 352 that carries out the automatic brake control process for automatically generating braking forces in the wheels 314 without reliance on a braking operation at the time of a vehicle collision, and that terminates the automatic brake control process based on operation of the accelerator pedal 334 or the brake pedal 336, and the braking force detecting unit (braking force detectors 329) for detecting braking forces generated in the wheels 314 by the automatic brake control process.

Even in the event that the accelerator pedal 334 or the brake pedal 336 is operated at the time of a vehicle collision, the automatic brake control unit 352 continues to perform the automatic brake control process until the braking forces B detected by the braking force detectors 329 reach the target braking force B0.

In the present embodiment, if the vehicle 312 is stopped without the braking force B detected by the braking force detecting unit having reached the target braking force B0, the automatic brake control unit 352 may terminate the automatic brake control process after the elapse of a predetermined braking continuation time t0 from stopping of the vehicle.

Fourth Embodiment

Next, a vehicle control apparatus 410 according to a fourth embodiment will be described with reference to FIGS. 9 through 13.

Figure 9:
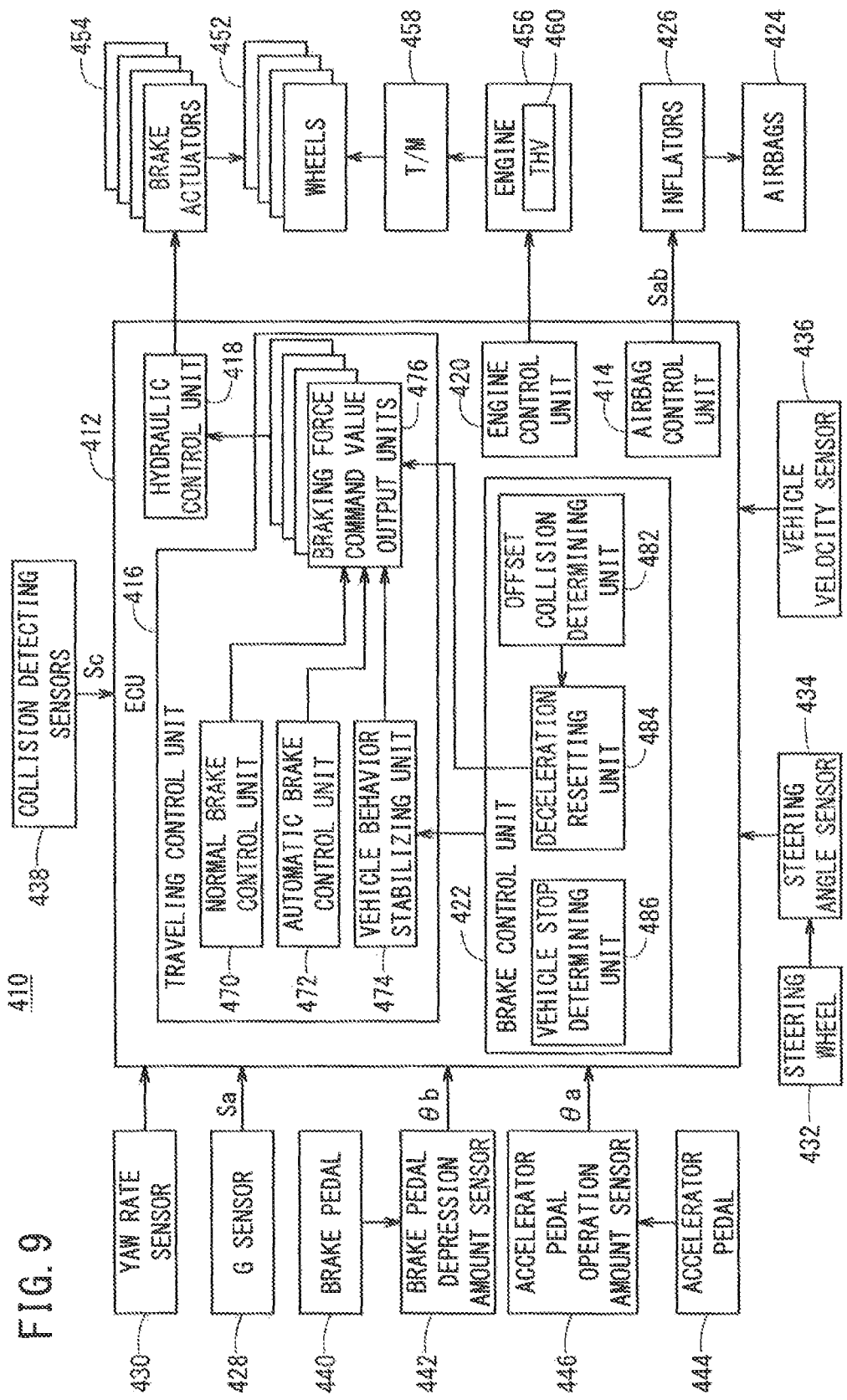
FIG. 9 is a block diagram of a vehicle equipped with a vehicle control apparatus according to a fourth embodiment of the present invention.

As shown in FIG. 9, the vehicle control apparatus 410 is equipped with an ECU 412 (Electronic Control Unit), which is constituted to include various control units therein. As is widely known, the ECU 412 is a calculator or computational unit containing a microcomputer, and includes a CPU (Central Processing Unit), a memory such as a ROM (including an EEPROM) and a RAM (Read Only Memory), in addition to input/output devices such as an A/D converter and a D/A converter, etc. The ECU 412 functions as various function realizing sections (function realizing unit), for example, a control unit, an arithmetic unit, and a processing unit or the like, by the CPU reading out and executing programs that are stored in the ROM. Such functions can also be implemented by hardware. Further, the ECU 412 can be integrated into a single unit, or can further be divided.

In the present embodiment, the ECU 412 includes an airbag control unit 414, a traveling control unit 416, a hydraulic control unit 418, an engine control unit 420, and a brake control unit 422. Airbags 424 are connected through an inflator 426 to the ECU 412. Further, various sensors are connected to the ECU 412.

As examples of such various sensors, there may be given a G sensor 428 that detects an acceleration of the vehicle in three orthogonal directions (vehicle length direction, vehicle width direction, vehicle height direction), a yaw rate sensor 430, a steering angle sensor 434 for detecting a steering angle of a steering wheel 432, a vehicle velocity sensor (vehicle velocity detecting unit) 436, collision detecting sensors 438 for detecting a collision site of the vehicle, a brake pedal depression amount sensor (brake pedal operation amount sensor) 442 for detecting an amount by which a brake pedal 440 is depressed, and an accelerator pedal operation amount sensor 446 for detecting an amount by which the accelerator pedal 444 is operated.

Figure 10:
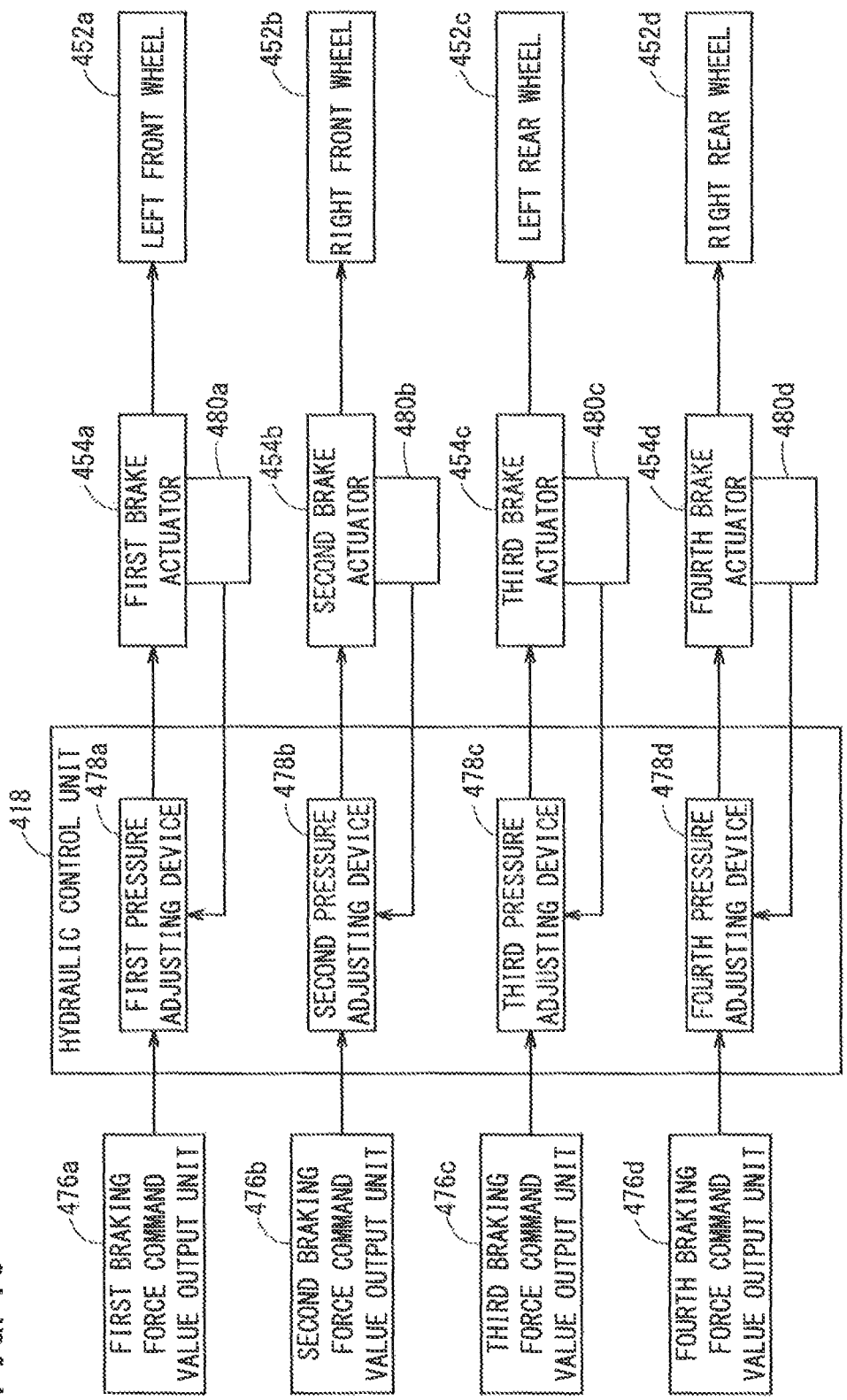
FIG. 10 is a block diagram showing the configuration of a brake system that extends from a braking force command value output unit to each of respective wheels.

A vehicle 450 (see, FIG. 11A) in which the vehicle control apparatus 410 according to the present embodiment is incorporated includes four wheels 452 (a left front wheel 452a, a right front wheel 452b, a left rear wheel 452c, and a right rear wheel 452d: refer to FIGS. 10 and 11A). Four brake actuators 454 (first through fourth brake actuators 454a to 454d: see FIG. 10) that generate braking forces are provided, respectively, in each of the wheels 452.

Among the four wheels 452, driving forces are transmitted from an engine 456 and through a transmission 458 (indicated by the label "T/M" in FIG. 9), for example, to the left rear wheel 452c and the right rear wheel 452d.

A number of rotations (engine RPM) or the like of the engine 456 is controlled through the engine control unit 420, which adjusts a degree of opening (throttle opening) TH of a throttle valve (indicated by the label "THV" in FIG. 9) 460 provided in the engine 456.

The throttle opening TH of the throttle valve 460 is adjusted through the engine control unit 420 responsive to the operation amount θa of the accelerator pedal 444, which is detected by the accelerator pedal operation amount sensor 446.

Wheel speed sensors (not shown) are disposed, respectively, in each of the wheels 452. The wheel speeds, which are detected by the four wheel speed sensors, and the average value thereof are supplied to the ECU 412 as the vehicle velocity that is detected by the vehicle velocity sensor 436.

The airbag control unit 414 is connected to the collision detecting sensors 438, the G sensor 428, and the inflator 426.

The collision detecting sensors 438, for example, are pressure sensors, at least four of which are provided in the vehicle 450. More specifically, as shown in FIG. 11A, the collision detecting sensors 438 include a first collision detecting sensor 438a and a second collision detecting sensor 438b, which are arranged on a left side and a right side of a front frame of the vehicle 450, and a third collision detecting sensor 438c and a fourth collision detecting sensor 438d, which are arranged on a left side and a right side of a rear frame of the vehicle 450.

In the airbag control unit 414, when a collision is detected by the collision detecting sensors 438, a collision detection signal Sc corresponding to the pressures occurring upon collision from the collision detecting sensors 438, and an acceleration signal Sa from the G sensor 428 (which can be converted to G) are supplied to the airbag control unit 414.

Based on the collision detection signal Sc and the acceleration signal Sa (G), the airbag control unit 414 generates an airbag deployment signal Sab, and drives the inflator 426 in order to deploy the airbags 424 corresponding to the location where the collision occurred.

On the other hand, the traveling control unit 416 includes at least a normal brake control unit 470, an automatic brake control unit 472, a vehicle behavior stabilizing unit (vehicle behavior stabilizing control unit) 474, and four braking force command value output units 476 (first through fourth braking force command value output units 476a to 476d).

The normal brake control unit 470 sets a deceleration in the braking force command value output units 476 corresponding to the depression amount θb of the brake pedal 440 as detected by the brake pedal depression amount sensor 442.

The automatic brake control unit 472 is started by a collision of such an extent that causes deployment of the airbags 424, and generates a deceleration Ga without reliance on the depression amount θb of the brake pedal 440, and sets the same in the braking force command value output units 476. This process is performed when a collision of the vehicle is recognized by the collision detection signal Sc from the collision detecting sensors 438 or the acceleration signal Sa(G) from the G sensor 428. The deceleration Ga set by the automatic brake control unit 472 may be a fixed deceleration that is set beforehand, or may be a deceleration that is calculated in order to reduce collision damage, based on an image from a camera or a reflected wave of an output wave from a radar or the like. As the fixed deceleration, for example, a rate of 0.5 G or the like may be given. Note that 1 G is equivalent to 9.8 [m/s$^2$].

As shown in FIG. 10, the hydraulic control unit 418 includes four pressure adjusting devices 478 (first through fourth pressure adjusting devices 478a to 478d) corresponding to the four brake actuators 454 (first through fourth brake actuators 454a to 454d). Further, four brake pressure sensors 480 (first through fourth brake pressure sensors 480a to 480d) are provided corresponding to the four brake actuators 454. Each of the brake pressure sensors 480 detects control hydraulic pressures (referred to below as "brake pressures") which correspond respectively to the brake actuators 454, and outputs the detected brake pressures to the corresponding pressure adjusting devices 478.

The brake pressures for each of the brake actuators 454 are controlled respectively by the four pressure adjusting devices 478 (first through fourth pressure adjusting devices 478a to 478d) in the hydraulic control unit 418, so as to attain brake pressures responsive to the deceleration that is set in each of the braking force command value output units 476.

More specifically, the hydraulic control unit 418 performs, for example, a feedback control on the respective brake pressures of the brake actuators 454, to result in brake pressures responsive to the decelerations set in the corresponding braking force command value output units 476. Accordingly, the vehicle 450 is decelerated by brake pressures that correspond to the set decelerations.

Further, the automatic brake control unit 472 judges that the vehicle 450 has come to a stop in the case that the velocity of the vehicle 450 is 0 [km/h], and this state is maintained for a duration of 1.5 seconds, for example. As this stage, when the vehicle 450 is in a stopped condition, the automatic brake control unit 472 terminates the automatic brake control process.

The vehicle behavior stabilizing unit 474 generates braking forces for the purpose of stabilizing the behavior of the vehicle 450, based on at least a yaw rate and a steering angle of the steering wheel 432. A deceleration, which is calculated with the aim of stabilizing vehicle behavior, for example, is set in the braking force command value output units 476. The vehicle behavior stabilization method is of a known technology, for example, according to a VSA (Vehicle Stability Assist) system.

Further, the traveling control unit 416 includes an ABS function, for example, which determines a slip-lock state of the respective wheels 452, and through the hydraulic control unit 418, independently adjusts the brake hydraulic pressures of each of the wheels 452 during braking.

The traveling control unit 416 senses the posture and behavior, etc., of the vehicle 450, using the G sensor 428 and the vehicle velocity sensor 436 (the respective wheel speed sensors). If over-steering is judged to have occurred, the traveling control unit 416 controls the hydraulic control unit 418 to apply braking to the wheel 452 on the outer turning side of the front wheels among the wheels 452.

On the other hand, in the case that under-steering is judged to have occurred, the traveling control unit 416 reduces the throttle opening TH of the throttle valve 460 through the engine control unit 420, and the driving force to the engine 456 is dropped down (reduced), together with controlling the hydraulic control unit 418 to apply braking to the wheel 452 of the vehicle 450 on the inner turning side of the rear wheels among the wheels 452.

In addition, as shown in FIG. 9, the brake control unit 422 of the vehicle control apparatus 410 according to the present embodiment includes an offset collision determining unit 482, a deceleration resetting unit 484, and a vehicle stop determining unit 486.

The offset collision determining unit 482 determines whether or not the collision that has taken place is an offset collision, based on the detection information (indicative of pressure values at the time of the collision) from the four collision detecting sensors 438. Such offset collisions include collisions (front collisions) in which a portion of the front part of the vehicle 450 collides against other vehicles or obstacles, and collisions (rear collisions) in which a portion of a rear part of the vehicle 450 collides against other vehicles or obstacles.

For example, as shown in FIG. 11A, if the pressure value Pa from the first collision detecting sensor 438a is of a high level, the pressure value Pb from the second collision detecting sensor 438b is of a mid to low level, and the respective pressure values Pc and Pd from the third collision detecting sensor 438c and the fourth collision detecting sensor 438d are of a low level, an offset collision (front collision) is judged to have occurred with respect to a left front portion of the vehicle 450.

For example, as shown in FIG. 11B, if the pressure value Pa from the first collision detecting sensor 438a is of a mid to low level, the pressure value Pb from the second collision detecting sensor 438b is of a high level, and the respective pressure values Pc and Pd from the third collision detecting sensor 438c and the fourth collision detecting sensor 438d are of a low level, an offset collision (front collision) is judged to have occurred with respect to a right front portion of the vehicle 450.

For example, as shown in FIG. 11C, if the respective pressure values Pa and Pb from the first collision detecting sensor 438a and the second collision detecting sensor 438b are of a low level, the pressure value Pc from the third collision detecting sensor 438c is of a high level, and the pressure value Pd from the fourth collision detecting sensor 438d is of a mid to low level, an offset collision (rear collision) is judged to have occurred with respect to a left rear portion of the vehicle 450.

For example, as shown in FIG. 11D, if the respective pressure values Pa and Pb from the first collision detecting sensor 438a and the second collision detecting sensor 438b are of a low level, the pressure value Pc from the third collision detecting sensor 438c is of a mid to low level, and the pressure value Pd from the fourth collision detecting sensor 438d is of a high level, an offset collision (rear collision) is judged to have occurred with respect to a right rear portion of the vehicle 450.

The deceleration resetting unit 484 increases the deceleration corresponding to at least one of the wheels on an opposite side from the collision site, from among the decelerations that have been set by the automatic brake control unit 472 in the first through fourth braking force command value output units 476a to 476d. The at least one wheel on a side opposite from the collision site, in the case that the offset collision is a front collision, refers to at least one wheel from among the rear wheels, whereas in the case that the offset collision is a rear collision, refers to at least one wheel from among the front wheels.

Normally, in the case that the vehicle 450 is subjected to an offset collision, a moment is generated about the center of gravity of the vehicle 450, which leads to a concern that the vehicle 450 will undergo rotational movement (spin). Thus, by increasing the braking force applied to at least one of the wheels on a side opposite to the collision site to be greater than that of the other wheels, at the time of an offset collision, a force that tends to rotate the vehicle 450 can be suppressed, and a contribution to rotation of the vehicle 450 can be prevented.

Basically, at least the four methods noted below (first through fourth resetting methods) may be offered as methods for resetting of the deceleration by the deceleration resetting unit 484.

The description given below concerning the first through fourth resetting methods assumes a case in which an offset collision takes place with respect to the left front side of the vehicle 450, as shown in FIG. 11A, for example.

As shown in FIG. 12A, in the first resetting method, a deceleration Gh (=Ga+ΔGh) (fixed value), which is higher than the current deceleration Ga, is set only in the fourth braking force command value output unit 476d corresponding to the wheel (in this example, the right rear wheel 452d) at a diagonally opposite position from the wheel nearest to the collision site (in this example, the left front wheel 452a). The value ΔGh is indicative of an additional deceleration applied with respect to the deceleration Ga that is set in the automatic brake control unit 472. Consequently, the braking force applied to the wheel at a diagonally opposite position to the wheel nearest to the collision site becomes greater than the braking forces applied to the other wheels.

In this case, at the time of an offset collision, since the braking force applied to one wheel at a diagonally opposite position to the wheel nearest to the collision site is increased merely to be greater than the braking forces applied to the other wheels (in this example, the left front wheel 452a, the right front wheel 452b, and the left rear wheel 452c), a force that tends to rotate the vehicle 450 at the time of the offset collision can be suppressed efficiently, and a contribution to rotation of the vehicle 450 can be prevented.

As shown in FIG. 12B, in the second resetting method, a deceleration Gh (=Ga+ΔGh) (fixed value), which is higher than the current deceleration Ga, is set respectively in the third braking force command value output unit 476c and in the fourth braking force command value output unit 476d (see FIG. 10), corresponding to a plurality of wheels (in this example, the left rear wheel 452c and the right rear wheel 452d) on an opposite side from the collision site. Consequently, the braking forces applied to the plurality of wheels on the side opposite from the collision site are increased to become greater than the braking forces applied to the plurality of wheels (in this example, the left front wheel 452a and the right front wheel 452b) on the same side as the collision site.

In this case as well, at the time of an offset collision, a force tending to rotate the vehicle 450 can be suppressed, and a contribution to rotation of the vehicle 450 can be prevented.

As shown in FIG. 12C, in the third resetting method, a first high deceleration Gh1 (=Ga+ΔGh1) (fixed value), which is higher than the current deceleration Ga, is set in the third braking force command value output unit 476c, and a second high deceleration Gh2 (=Ga+ΔGh2) (fixed value), which is higher than the first high deceleration Gh1, is set in the fourth braking force command value output unit 476d, from among the third braking force command value output unit 476c and the fourth braking force command value output unit 476d (see FIG. 10), corresponding to a plurality of wheels (in this example, the left rear wheel 452c and the right rear wheel 452d) on an opposite side from the collision site. Both of the values ΔGh1 and ΔGh2 are additional decelerations applied with respect to the deceleration Ga, wherein ΔGh2>ΔGh1.

More specifically, the braking forces applied to the plurality of wheels on the side opposite from the collision site are increased to become greater than the braking forces applied to the plurality of wheels on the same side as the collision site, and the braking force applied to the wheel that is diagonally opposite from the wheel nearest to the collision site is greatest overall.

In this case as well, at the time of an offset collision, a force tending to rotate the vehicle 450 can be suppressed, and a contribution to rotation of the vehicle 450 can be prevented.

The fourth resetting method is substantially the same as the aforementioned third resetting method, but differs therefrom in that the decelerations are reset based on pressure values Pa and Pb from the two collision detecting sensors 438 (the first collision detecting sensor 438a and the second collision detecting sensor 438b) that are nearest to the collision site from among the four collision detecting sensors 438.

More specifically, although not illustrated, in the case of a front collision (full-wrap collision) of the vehicle 450, the collision site is placed in the center in the widthwise direction of the vehicle 450, or at an area in the vicinity thereof. At this time, the pressure value Pa from the first collision detecting sensor 438a and the pressure value Pb from the second collision detecting sensor 438b are substantially equal. As shown in FIG. 12D, the difference between the pressure value Pa from the first collision detecting sensor 438a and the pressure value Pb from the second collision detecting sensor 438b gradually becomes greater as the collision site moves away from the center, for example toward the left, in the widthwise direction of the vehicle 450.

Thus, according to the fourth resetting method, a constant high deceleration Gh (=Ga+ΔGh) is distributed responsive to the pressure value Pa from the first collision detecting sensor 438a and the pressure value Pb from the second collision detecting sensor 438b. More specifically, the added deceleration ΔGh1 of the first high deceleration Gh1 (Ga+ΔGh1), and the added deceleration ΔGh2 of the second high deceleration Gh2 (Ga+ΔGh2) are determined by the following equations.

$$\Delta Gh1 = \Delta Gh \times \{Pb/(Pa+Pb)\}$$

$$\Delta Gh2 = \Delta Gh \times \{Pa/(Pa+Pb)\}$$

More specifically, the fourth resetting method is the same as the third resetting method, in that the braking forces applied to the plurality of wheels on the side opposite from the collision site are increased to become greater than the braking forces applied to the plurality of wheels on the same side as the collision site. Furthermore, the braking force applied to the wheel that is diagonally opposite from the wheel nearest to the collision site is greatest overall. However, the braking forces applied to the plurality of wheels (in this example, the left rear wheel 452c and the right rear wheel 452d) on the opposite side from the collision site differ in that they are increased separately, respectively, responsive to the collision site.

Normally, in accordance with the collision site moving away from the center in the widthwise direction of the vehicle 450, the moment that is generated around the center of gravity of the vehicle 450 becomes larger. Thus, by increasing the braking force applied to the plurality of wheels on the opposite side from the collision site to be individually greater, respectively, responsive to the collision site, at the time of an offset collision, a force that tends to rotate the vehicle 450 can be suppressed efficiently, and a contribution to rotation of the vehicle 450 can be prevented.

The description that was presented above concerning the first through fourth resetting methods assumed a case in which the offset collision (front collision) occurred with respect to the left front side of the vehicle 450, as shown primarily in FIG. 11A. However, apart therefrom, such methods can be carried out in the same manner for the cases of an offset collision (front collision) that takes place with respect to the right front side of the vehicle 450 as shown in FIG. 11B, an offset collision (rear collision) that takes place with respect to the left rear side of the vehicle 450 as shown in FIG. 11C, and an offset collision (rear collision) that takes place with respect to the right rear side of the vehicle 450 as shown in FIG. 11D.

On the other hand, the vehicle stop determining unit 486 judges that the vehicle 450 has come to a stop, in the case that the velocity of the vehicle 450 is 0 [km/h], and this state is maintained for a duration of 3.0 seconds, for example.

Further, in the case that the collision that has occurred is an offset collision, the brake control unit 422 controls the traveling control unit 416, and disables the control that is carried out by the vehicle behavior stabilizing unit 474. Disabling of the control that is carried out by the vehicle behavior stabilizing unit 474 can be implemented by making the vehicle behavior stabilizing unit 474 inoperable, or by not using (e.g., blocking) signals that are output from the vehicle behavior stabilizing unit 474, etc.

The steering wheel 432 is moved in unintended directions by an offset collision, and further, by the yaw rate sensor 430 outputting an abnormal value, the vehicle behavior stabilizing unit 474 generates unintended braking forces with respect to the vehicle 450, so that when an offset collision occurs, there is a concern that the force tending to rotate the vehicle 450 cannot be suppressed sufficiently. Thus, in the event that the collision is an offset collision, by disabling the control that is carried out by the vehicle behavior stabilizing unit 474, suppression of forces that tend to rotate the vehicle at the time of an actual offset collision can be exhibited sufficiently.

Figure 13:
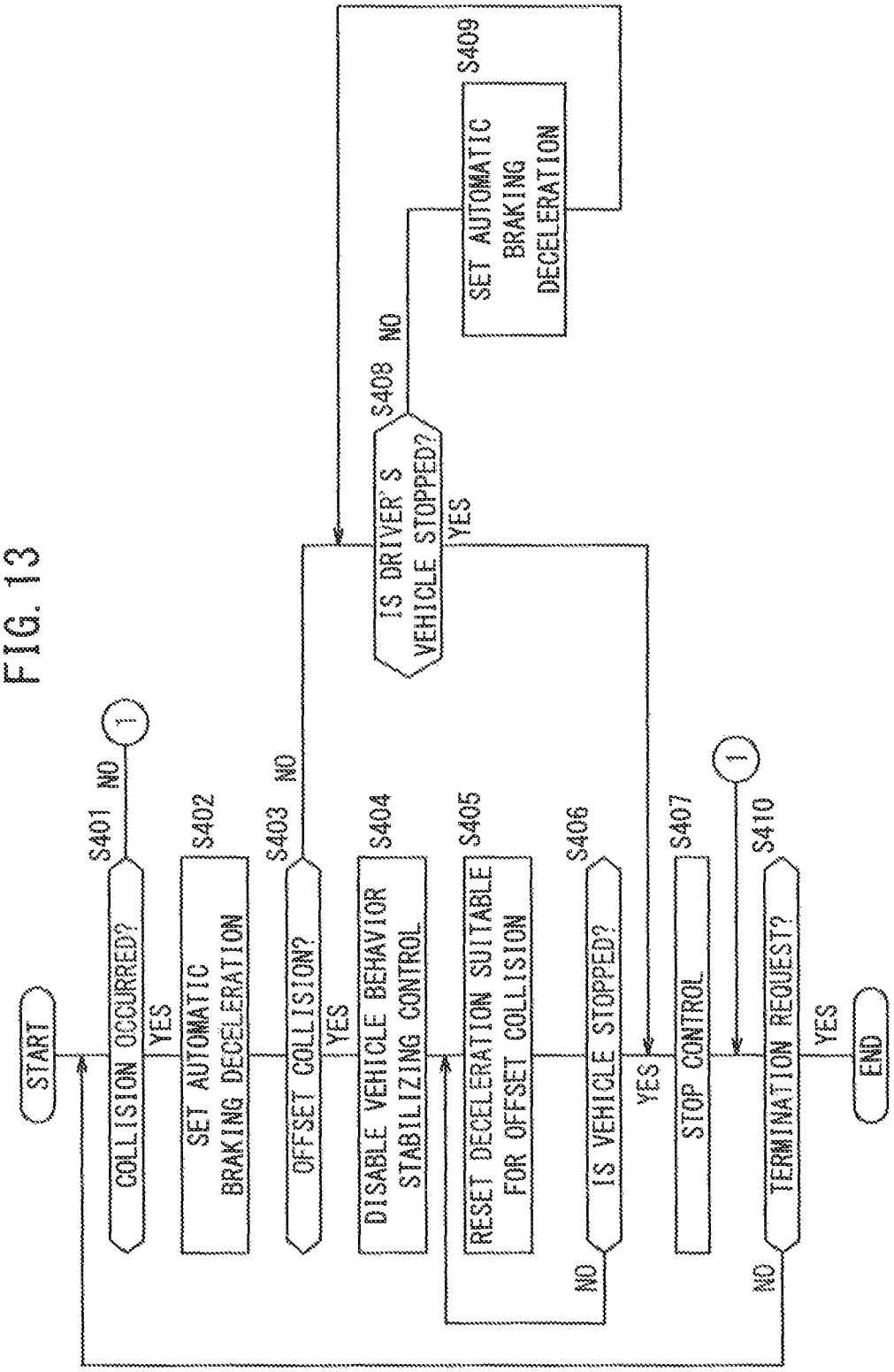
FIG. 13 is a flowchart showing processing operations of the vehicle control apparatus shown in FIG. 9.

Next, processing operations of the vehicle control apparatus 410, and primarily processing operations of the automatic brake control unit 472 and the brake control unit 422, will be described with reference to the flowchart of FIG. 13.

First, in step S401, the automatic brake control unit 472 judges whether or not a collision has occurred of such an extent that requires the airbags 424 to be deployed. Such a judgment is performed by determining whether a collision detection signal Sc has been input from the collision detecting sensors 438 and an acceleration signal Sa(G) has been input from the G sensor 428.

If a collision has occurred, the process proceeds to the next step S402, and the automatic brake control unit 472 sets the automatic braking deceleration in the braking force command value output units 476. Accordingly, the vehicle 450 is decelerated by brake pressures that correspond to the set deceleration.

In step S403, the offset collision determining unit 482 of the brake control unit 422 determines whether or not the collision that has taken place is an offset collision. If an offset collision has occurred, the process proceeds to the next step S404, and the brake control unit 422 controls the traveling control unit 416, and disables the control that is carried out by the vehicle behavior stabilizing unit 474.

In step S405, the deceleration resetting unit 484 carries out resetting of the deceleration (deceleration suitable for an offset collision) with respect to the target braking force command value output units 476, in accordance with one of the first through fourth resetting methods. Accordingly, the vehicle 450 is decelerated by brake pressures that correspond to the reset deceleration, while in addition, the vehicle 450 is decelerated while suppressing forces generated during the offset collision that tend to rotate the vehicle 450.

In step S406, the vehicle stop determining unit 486 determines whether or not the vehicle 450 is stopped. If it is judged that the vehicle 450 is not stopped, step S405 is returned to, whereupon step S405 and the steps thereafter are repeated.

Further, if it is judged in step S406 that the vehicle is stopped, the process proceeds to step S407, and the control performed by the brake control unit 422 is terminated.

On the other hand, if it is judged in step S403 that an offset collision has not occurred, the process proceeds to step S408, and the automatic brake control unit 472 judges whether or not the vehicle 450 (driver's own vehicle) is stopped. If it is judged that the vehicle is not stopped, the process proceeds to step S409, and the automatic brake control unit 472 sets the automatic braking deceleration in the braking force command value output units 476. Accordingly, the vehicle 450 is decelerated by brake pressures that correspond to the set deceleration.

At a stage when the process of step S409 is ended, step S408 is returned to, whereupon step S408 and the steps thereafter are repeated.

If it is judged in step S408 that the vehicle is stopped, the process proceeds to step S407, and the control performed by the automatic brake control unit 472 is terminated.

At the stage of termination of processing in step S407, or alternatively, if it is judged that a collision has not occurred in step S401, the process proceeds to step S410, whereupon the ECU 412 determines whether or not there is a termination request (power shutdown, maintenance, etc.). If there is not a termination request, step S401 is returned to, and the processes of step S401 and the steps thereafter are repeated. If there is a termination request, the processing operations of the vehicle control apparatus 410 are brought to an end.

The present embodiment is not limited to the configuration described above. For example, the vehicle control apparatus 410 according to the present embodiment may include configurations and functions that have not been particularly specified for this embodiment, which are included among those of the vehicle control apparatus 10 according to the above-described first embodiment. In other words, the automatic brake control unit 472 may make the braking force to the wheels 452 smaller as the vehicle velocity becomes higher after a vehicle collision (or immediately after a vehicle collision), which is detected by the vehicle velocity detector 436.

Summary of the Fourth Embodiment

As has been described above, the vehicle control apparatus 410 according to the present embodiment includes the brake controller (automatic brake control unit 472), which increases the braking force at the time of a collision of the driver's own vehicle 450, the collision site detecting unit (collision detecting sensors 438) for detecting a collision site of the driver's own vehicle 450, and the control unit (brake control unit 422). Additionally, in the case that the collision is an offset collision, the control unit increases the braking force applied to at least one of the wheels 452 on a side opposite from the collision site detected by the collision site detecting unit to be greater than the braking forces applied to the other wheels 452.

In the present embodiment, if the collision is an offset collision, the control unit may increase the braking force applied to a wheel 452 at a diagonally opposite position to the wheel 452 nearest to the collision site to be greater than the braking forces applied to the other wheels 452.

In the present embodiment, if the collision is an offset collision, the control unit may increase the braking forces applied to a plurality of wheels 452 on the opposite side from the collision site to be greater than the braking forces applied to a plurality of wheels 452 on the same side as the collision site.

In this case, the control unit may cause the braking force applied to the wheel 452 at a diagonally opposite position to the wheel 452 nearest to the collision site to be greatest.

Furthermore, if the collision is an offset collision, the control unit may cause the braking force applied to the plurality of wheels 452 on the opposite side from the collision site to increase individually, respectively, responsive to the collision site.

In the present embodiment, there may further be included a vehicle behavior stabilizing control unit (vehicle behavior stabilizing unit 474) that stabilizes the behavior of the driver's own vehicle 450 based on at least a yaw rate and a steering angle of the steering wheel 432 of the driver's own vehicle 450. In addition, if the collision is an offset collision, the control unit may disable the control process that is carried out by the vehicle behavior stabilizer.

The present invention is not limited to the above-described embodiments, but various arrangements may be adopted therein based on the descriptive content of the present invention.

What is claimed is:

1. A vehicle control apparatus comprising:
   a vehicle velocity detector configured to detect a vehicle velocity of a driver's own vehicle; and
   an integrated control unit including a processor, the processor being configured to provide an automatic brake control unit that performs an automatic brake control process by causing a braking force applied to wheels to be generated automatically without relying on a braking operation when the vehicle is involved in a vehicle collision;
   wherein the automatic brake control unit makes a braking force to the wheels smaller as the vehicle velocity detected by the vehicle velocity detector becomes higher after the vehicle collision.

2. The vehicle control apparatus according to claim 1, wherein the processor is further configured to provide:

an antilock brake control unit that performs an antilock brake control process for suppressing locking of the wheels; and
a vehicle behavior stabilizing control unit that performs a vehicle behavior stabilizing control process for suppressing disturbances in vehicle behavior;
wherein, when the antilock brake control process or the vehicle behavior stabilizing control process is actuated during operation of the automatic brake control process, the automatic brake control process is stopped, and the braking force applied to the wheels is generated based on the antilock brake control process or the vehicle behavior stabilizing control process.

3. The vehicle control apparatus according to claim 1, wherein the processor is further configured to provide:
an antilock brake control unit that performs an antilock brake control process for suppressing locking of the wheels; and
a vehicle behavior stabilizing control unit that performs a vehicle behavior stabilizing control process for suppressing disturbances in vehicle behavior;
wherein, when the vehicle velocity after a vehicle collision, which is detected by the vehicle velocity detector, is greater than or equal to a predetermined velocity, the antilock brake control process and the vehicle behavior stabilizing control process are made capable of being actuated, whereas when the vehicle velocity after a vehicle collision, which is detected by the vehicle velocity detector, is less than the predetermined velocity, the antilock brake control process and the vehicle behavior stabilizing control process are prohibited from being actuated.

4. The vehicle control apparatus according to claim 1, further comprising:
an inclination detector configured to detect an inclination of a road surface on which the driver's own vehicle is positioned at a time of a vehicle collision;
wherein the automatic brake control unit causes the braking force to the wheels when the driver's own vehicle is positioned on a downhill slope at the time of the collision to be greater than a braking force to the wheels when the driver's own vehicle is positioned on an uphill slope at the time of the collision.

5. The vehicle control apparatus according to claim 4, wherein the automatic brake control unit causes a braking force to the wheels when the driver's own vehicle is hit from behind on the downhill slope to be smaller than a braking force to the wheels when the driver's own vehicle is hit from the front on the downhill slope.

6. The vehicle control apparatus according to claim 4, wherein:
the automatic brake control unit continues to generate the braking force applied to the wheels until a predetermined braking continuation time has elapsed from stopping of the vehicle after the vehicle collision; and
a braking continuation time when the driver's own vehicle is hit from behind on the downhill slope is made longer than a braking continuation time when the driver's own vehicle is hit from behind on the uphill slope.

7. The vehicle control apparatus according to claim 1, further comprising:
a braking force detector configured to detect the braking force generated in the wheels by the automatic brake control process;
wherein the automatic brake control unit stops the automatic brake control process based on operation of an accelerator pedal or a brake pedal, whereas when the vehicle is involved in a collision, even when the accelerator pedal or the brake pedal is operated, the automatic brake control process is continued until a braking force detected by the braking force detector reaches a target braking force.

8. The vehicle control apparatus according to claim 7, wherein when the vehicle is stopped without the braking force detected by the braking force detector having reached the target braking force, the automatic brake control unit terminates the automatic brake control process after an elapse of a predetermined braking continuation time from stopping of the vehicle.

9. The vehicle control apparatus according to claim 1, further comprising:
a collision site detector configured to detect a collision site of the driver's own vehicle;
wherein, when the collision is an offset collision, the processor is configured to increase the braking force applied to at least one wheel on a side opposite from the collision site detected by the collision site detector to be greater than the braking force applied to other wheels.

10. The vehicle control apparatus according to claim 9, wherein, when the collision is the offset collision, the processor is configured to increase the braking force applied to a wheel at a diagonally opposite position to the wheel nearest to the collision site to be greater than the braking force applied to the other wheels.

11. The vehicle control apparatus according to claim 9, wherein, when the collision is the offset collision, the processor is configured to increase the braking force applied to a plurality of wheels on the opposite side from the collision site to be greater than the braking force applied to a plurality of wheels on same side as the collision site.

12. The vehicle control apparatus according to claim 11, wherein the processor is configured to cause the braking force applied to the wheel at a diagonally opposite position to the wheel nearest to the collision site to be greatest.

13. The vehicle control apparatus according to claim 12, wherein, when the collision is the offset collision, the processor is configured to cause the braking force applied to the plurality of wheels on the opposite side from the collision site to increase individually, respectively, corresponding to the collision site.

14. The vehicle control apparatus according to claim 9, wherein the processor is further configured to provide:
a vehicle behavior stabilizing control unit that stabilizes the behavior of the driver's own vehicle based on at least a yaw rate and a steering angle of a steering wheel of the driver's own vehicle;
wherein, when the collision is the offset collision, the processor is further configured to disable control by the vehicle behavior stabilizing control unit.

* * * * *